United States Patent
Ayyar et al.

(10) Patent No.: US 12,315,292 B2
(45) Date of Patent: May 27, 2025

(54) IDENTIFICATION OF INDIVIDUALS IN A DIGITAL FILE USING MEDIA ANALYSIS TECHNIQUES

(71) Applicant: Percipient.ai Inc., Santa Clara, CA (US)

(72) Inventors: Balan Rama Ayyar, Oakton, VA (US); Anantha Krishnan Bangalore, Sterling, VA (US); Jerome Francois Berclaz, Sunnyvale, CA (US); Reechik Chatterjee, Washington, DC (US); Nikhil Kumar Gupta, Oak Hill, VA (US); Ivan Kovtun, Cupertino, CA (US); Vasudev Parameswaran, Fremont, CA (US); Timo Pekka Pylvaenaeinen, Menlo Park, CA (US); Rajendra Jayantilal Shah, Cupertino, CA (US)

(73) Assignee: Percipient.AI Inc., Santa Clara, CA (US)

( * ) Notice: Subject to any disclaimer, the term of this patent is extended or adjusted under 35 U.S.C. 154(b) by 0 days.

(21) Appl. No.: 16/120,128

(22) Filed: Aug. 31, 2018

(65) Prior Publication Data
US 2019/0073520 A1 Mar. 7, 2019

Related U.S. Application Data

(60) Provisional application No. 62/553,725, filed on Sep. 1, 2017.

(51) Int. Cl.
G06K 9/00 (2022.01)
G06F 16/738 (2019.01)
(Continued)

(52) U.S. Cl.
CPC .......... *G06V 40/162* (2022.01); *G06F 16/738* (2019.01); *G06F 16/784* (2019.01);
(Continued)

(58) Field of Classification Search
CPC .......... G06K 9/00234; G06K 9/00677; G06K 9/00288; G06K 9/00295; G06K 9/00718;
(Continued)

(56) References Cited

U.S. PATENT DOCUMENTS

| | | | |
|---|---|---|---|
| 7,295,687 B2 | 11/2007 | Kee et al. | |
| 7,689,011 B2 * | 3/2010 | Luo | G06K 9/00221 |
| | | | 382/118 |

(Continued)

FOREIGN PATENT DOCUMENTS

| | | |
|---|---|---|
| CN | 114863411 | 8/2022 |
| WO | 2019035771 | 2/2019 |
| WO | 2021146703 | 7/2021 |

OTHER PUBLICATIONS

Liu, W. et al., "SSD: Single Shot MultiBox Detector," European Conference on Computer Vision, 2016, pp. 21-37.
(Continued)

*Primary Examiner* — Leon Viet Q Nguyen
(74) *Attorney, Agent, or Firm* — James E. Eakin

(57) ABSTRACT

This description describes a system for identifying individuals within a digital file. The system accesses a digital file describing the movement of unidentified individuals and detects a face for an unidentified individual at a plurality of locations in the video. The system divides the digital file into a set of segments and detects a face of an unidentified individual by applying a detection algorithm to each segment. For each detected face, the system applies a recognition algorithm to extract feature vectors representative of the identity of the detected faces which are stored in computer
(Continued)

memory. The system applies a recognition algorithm to query the extracted feature vectors for target individuals by matching unidentified individuals to target individuals, determining a confidence level describing the likelihood that the match is correct, and generating a report to be presented to a user of the system.

11 Claims, 21 Drawing Sheets

(51) Int. Cl.
*G06F 16/783* (2019.01)
*G06V 10/74* (2022.01)
*G06V 20/30* (2022.01)
*G06V 20/40* (2022.01)
*G06V 40/16* (2022.01)

(52) U.S. Cl.
CPC ............ *G06V 10/761* (2022.01); *G06V 20/30* (2022.01); *G06V 20/41* (2022.01); *G06V 20/49* (2022.01); *G06V 40/165* (2022.01); *G06V 40/168* (2022.01); *G06V 40/172* (2022.01); *G06V 40/173* (2022.01)

(58) Field of Classification Search
CPC .... G06K 9/00765; G06K 9/42; G06F 16/784; G06F 16/738
See application file for complete search history.

(56) References Cited

U.S. PATENT DOCUMENTS

| | | | | |
|---|---|---|---|---|
| 8,437,504 | B2* | 5/2013 | Sugai | G06K 9/3216 382/103 |
| 9,275,269 | B1* | 3/2016 | Li | G06K 9/00624 |
| 9,373,024 | B2* | 6/2016 | Liu | G06F 16/5854 |
| 9,892,324 | B1* | 2/2018 | Pachauri | G06V 10/763 |
| 2006/0204058 | A1* | 9/2006 | Kim | G06K 9/00288 382/118 |
| 2007/0110422 | A1* | 5/2007 | Minato | G06V 40/165 396/14 |
| 2008/0144941 | A1* | 6/2008 | Togashi | G06F 16/5838 |
| 2008/0247611 | A1 | 10/2008 | Aisaka et al. | |
| 2010/0287053 | A1 | 11/2010 | Ganong et al. | |
| 2011/0128288 | A1 | 6/2011 | Petrou et al. | |
| 2013/0050492 | A1 | 2/2013 | Lehning | |
| 2014/0270386 | A1 | 9/2014 | Leihs et al. | |
| 2016/0012623 | A1 | 1/2016 | Breckenridge et al. | |
| 2016/0063335 | A1* | 3/2016 | Wang | G06K 9/00268 382/115 |
| 2016/0299920 | A1* | 10/2016 | Feng | G06F 16/5838 |
| 2017/0061249 | A1 | 3/2017 | Estrada et al. | |
| 2017/0220887 | A1 | 8/2017 | Fathi et al. | |
| 2018/0114056 | A1 | 4/2018 | Wang et al. | |
| 2018/0157939 | A1* | 6/2018 | Butt | G06V 10/764 |
| 2018/0268292 | A1 | 9/2018 | Choi et al. | |
| 2019/0073520 | A1 | 3/2019 | Ayyar et al. | |
| 2019/0325595 | A1 | 10/2019 | Stein et al. | |
| 2020/0118292 | A1 | 4/2020 | Estrada et al. | |
| 2021/0133461 | A1* | 5/2021 | Ren | G06F 16/5838 |
| 2021/0407090 | A1 | 12/2021 | Li et al. | |
| 2022/0036194 | A1 | 2/2022 | Sundaresan et al. | |
| 2022/0067394 | A1 | 3/2022 | Suksi et al. | |
| 2023/0020634 | A1 | 1/2023 | Kalman et al. | |

OTHER PUBLICATIONS

PCT International Search Report and Written Opinion, PCT Application No. PCT/US2018/049264, Nov. 28, 2018, 21 pages.

Schroff, F. et al., "FaceNet: A Unified Embedding for Face Recognition and Clustering," Proceedings of the IEEE conference on computer vision and pattern recognition, 2015, Extended Abstract, 1 page.

Bunyarit et al., "Robust Object Detection on Video Surveillance", 2011 Eighth International Joint Conference on Computer Science and Software Engineering, 2011, retrieved on [Mar. 18, 2021], Retrieved from the internet <URL: https://ieeexplore.ieee.org/stamp/stamp.jsp? tp=&arnumber=5930111> entire document.

Jekel et al., "Classiying Online Profiles on Tinder Using FaceNet Facial Embeddings", Department of Mechanical & Aerospace Enginnering—University of Florida, Mar. 12, 2018, retrieved on [Mar. 18, 2021]. Retrieved from the internet <URL:https://arxiv.org/pdf/1803.04347.pdf> entire document.

Illa Sucholutsky and Matthias Schonlau, Dept of Statistics and Actuarial Science; University of Waterloo, Waterloo, Ontario, Canada (May 5, 2020). "Soft-Label Dataset Distillation and Text Dataset Distillation." ISUCHOLU@UWATERLOO.CA., arXiv:1910.02551.v3 [cs.LG].

DaAzhi Luo; Guihua Wen; Danyang Li; Yang Hu; Eryang Huan; "Deep-Learning-Based face detection Using Iterative Bounding-Box Regressiion"., Multimed Tools Appl (2018) 77:24663-24680; https://doi.org/1007/s11042-018-5658-5.

Beijing University of Posts and Telecommunications, "License Plate Recognition Method and Device" CN114863411; [Jul. 31, 2023; 7:38 AM.

Xiang Zhang; Chao Zhao; Hangzai Luo; Wanqing Zhao; Sheng Zhong; Lei Tang; Jinye Peng; Jianping Fan "; School of Information and Technology Northwest Univ, Shaaanxi, 710127, China;" Xian Mictroelectron Technology Institute; Department of Computer Science, UNC—Charlotte, USA: https://doi.org/10.1016/j.neucom.2022.02.012;0925-2312/2022; Elsevier B.V.

Zhang et al., "Automatic Learning for Object Detection", Neurocomputing, vol. 484, May 1, 2022; pp. 260-272; Received Apr. 10, 2021, Revised Oct. 9, 2021, accepted Feb. 3, 2022, Available online Feb. 7, 2022. Version of Record Mar. 10, 2022; retrieved on [Aug. 20, 2023]; retrieved from the internet; https://www..sciencedirect.com/science/article/pii/S0925231222001540/pdf.

\* cited by examiner

IDENTIFICATION OF INDIVIDUALS IN A DIGITAL FILE USING MEDIA ANALYSIS TECHNIQUES

CROSS REFERENCE TO RELATED APPLICATIONS

This application claims the benefit of U.S. Provisional Application No. 62/553,725, filed on Sep. 1, 2017, which is incorporated herein by reference in its entirety for all purposes.

TECHNICAL FIELD

The disclosure relates generally to method for identifying unknown individuals within a digital file, and more specifically to identifying unknown individuals within a digital file based on an analysis of extracted feature vectors.

BACKGROUND

Image recognition techniques are valuable tools in analyzing recordings of an environment and extrapolating conclusions based on those recordings. However, conventional image recognition platforms are imprecise with little capacity for recalling previously identified data or previously conducted searches. As a result, existing image recognition platforms require a significant amount of oversight and input from human operators throughout the process. Additionally, the need for human operators to manually sift through large amounts of image data delays the speed at which operators may interpret the data. The resulting delay may prove to be costly in certain environments, for example environments with public safety concerns. For these reasons, there exists a need for an improved image recognition platform capable of contextualizing and interpreting large amounts of image data with limited human interaction as well as conveying conclusions based on the data at near real-time speeds.

SUMMARY

Described herein is a multisensor image processing system capable of processing and interpreting data recorded by one or more sensors including, but not limited to, full motion video, infrared sensor data, audio communication signals, or geo-spatial image data. The disclosed system analyzes recorded sensor data and present the data in a manner such that human operators are able to view the analyzed data at near real-time rates and contextualize and understand the multisensor data without complications or delay. By implementing computer vision algorithms, the multisensor processing system improves how the human operator perceives the recorded data by constantly improving the precision and recall of the system through variations of supervised learning techniques. As a result, the system provides human operators or users automated, real-time alerts for individuals, objects, or activities performed by individuals of interest to the users.

Also disclosed is a configuration (e.g., a system, a method, or stored program code executable by a processor) for identifying individuals within a digital file accessed from computer memory. The digital file describes the movement of one or more unidentified individuals over a period time through a series of frames. The multisensor processing system identifies an unidentified individual at a plurality of locations which together represent the movement of the unidentified individual over a period of time. The system divides individual frames of the digital file into multiple segments such that, within each segment, the content of that segment is magnified relative to the content of the frame. For each segment, the detection algorithm identifies a face of an unidentified individual and distinguishes the face from the environment surrounding it within the recording of the digital file.

For each detected face within a segment, the multisensor processing system applies a recognition algorithm to match the unidentified individual to a target individual based on their level of similarity and determines a confidence level describing the accuracy of the match between the unidentified individual and the target individual. The confidence level may be related to both the image resolution at which the candidate face was verified within the segment and the distance between feature vectors of the faces of the target individual and the unidentified individual. Using all of the matches identified within each segment, the system generates a report to be presented to a user of the system. The report includes an indication that an unidentified individual within the digital file matched with a target individual, the confidence level assigned to that match, and a notification indicating where the target individual appears in the digital file.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Multisensor Processing System Overview

Figure 1:
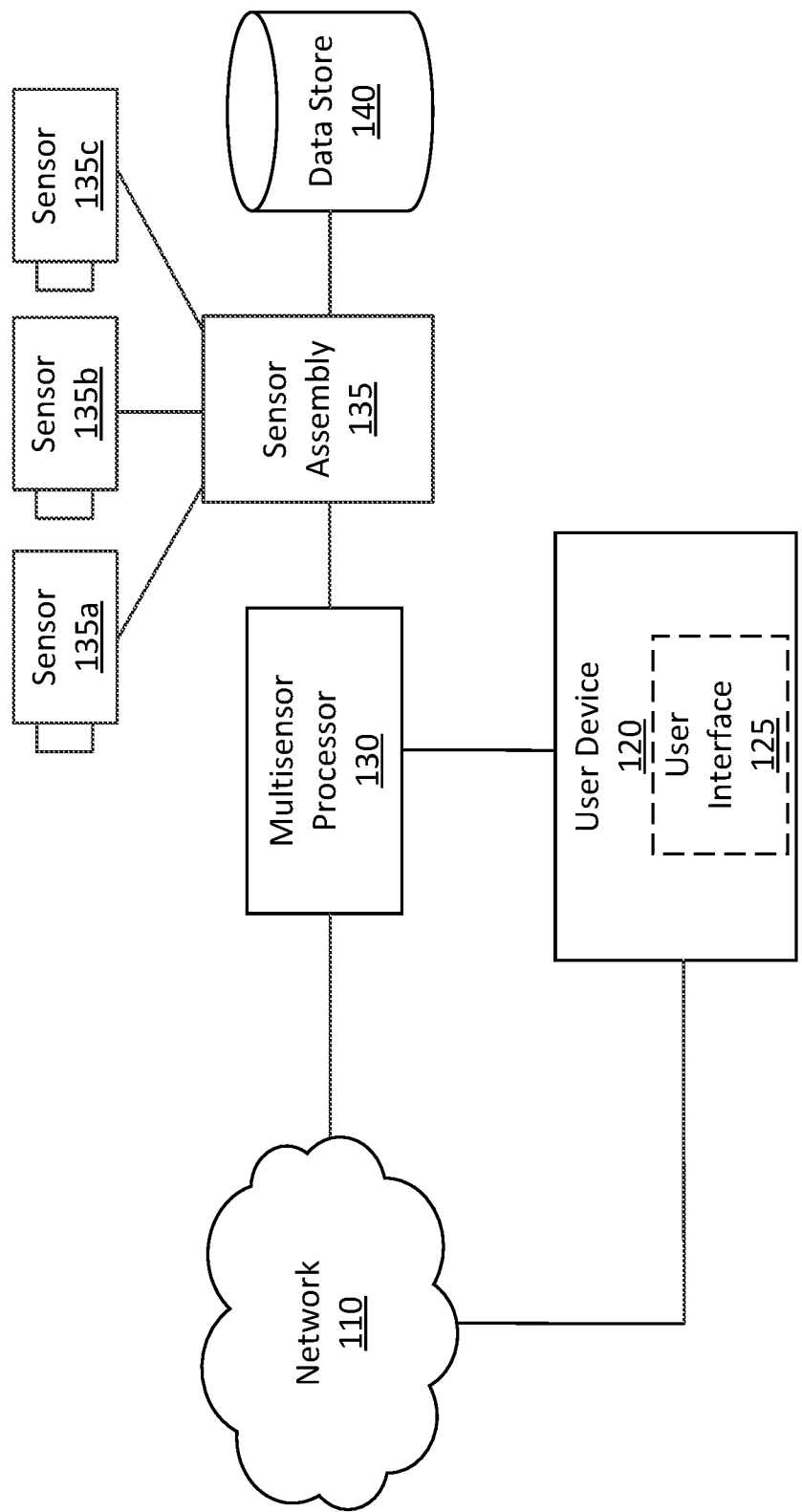
FIG. 1 is a block diagram of a system environment 100, according to an embodiment.

FIG. 1 is a block diagram of a system environment 100, according to an embodiment. FIG. 1 shows a sensor processing system 100 for analyzing digital files and identify faces of individuals or objects within the digital file using object recognition techniques. In the implementation shown by FIG. 1, the system environment comprises a network 110, a user device 120, a multisensor processor 130, a sensor assembly 135, and a sensor data store 140. However, in other embodiments, the system environment 100 may include different and/or additional components.

The user device 120 is a computing device capable of communicating with other components of the system. The user device 120 has data processing and data communication abilities. By way of example the user device 120 may deliver requests for object recognition to the multisensor process 130. The user device 120 also may receive input. For example the user device 120 may receive information regarding the results of an object recognition search. A user device 120 may be used by a user who consumes the services offered by the multisensor processor 130. Examples of user devices 20 include, but are not limited to, desktop computers, laptop computers, portable computers, personal digital assistants, smartphones or any other device including computing functionality and data communication capabilities. An example of an architecture for the user device is described with respect to FIG. 11.

One or more user devices 120 communicate with the multisensor processor 130 via the network 110. In one embodiment, a user device 120 executes an application allowing a user to interact with the multisensor processor 130 via a user interface 125. In one implementation, the user interface 125 allows the user to generate and deliver a search request for individuals or objects in a digital file or to review the results of a search request received from the processor 130. Each user device may further include or be associated with a visual user interface capable of displaying user interfaces and data visualizations, depending on the implementation. The visual interface may display user interfaces and data visualizations directly (e.g., on a screen) or indirectly on a surface, window, or the like (e.g., a visual projection unit. For ease of discussion, the visual interface may be described as a display.

The multisensor processor 130 performs the analysis of a digital file, which is further described below. The multisensory processor 130 is configured to identify unidentified individuals in an environment in response to either a search query received from a user of the processor platform or the detection of an individual. The multisensor processor 130 accesses data in the form of a digital file stored by the data store 140 or recorded by the sensor assembly 135. The data store 140 stores digital files of interest to users of the processing system 100, for example, an image or video comprising one or more individuals of interest. The data stored 140 also stores metadata associated with each digital file, for example, a timestamp of when the digital file was recorded, the location of the recording, or notable events recorded within the digital file, etc. Various implementations of the sensor assembly 135 may include combinations of one or more of following: multispectral imaging sensors, audio recorders, digital communications monitors, internet traffic scanners, and/or mobile network taps. The data collected by the sensor assembly 135 may be correlated with detections of specific individuals within the recorded. For example, a sensor assembly 135 comprises network scanners collect anonymized emails which can be associated with an author of the emails using a timestamp and visual evidence. In other implementations, individuals may be recognized and identified using a voice signature. Data collected by the sensor assembly 135 or stored in the data store 140 is communicated to the multisensor processor 130 to be analyzed using object recognition techniques. The multisensor processor 130 may also process a digital file in a "raw" format that may not be directly usable and converts it into a form that is useful for another type of processing. In some implementations, the multisensor processor 130 includes software architecture for supporting access and use of the processor 130 by many different users simultaneously through the network 110, and thus at a high level can be generally characterized as a cloud-based system. In some instances, the operation of the multisensor processor 130 is monitored by, for example, a human user that, when necessary, may dynamically update, halt or override all or part of the identification of individuals within the digital file.

Interactions between the multisensor processor 130, the user device 120, and additional components of the processing system 100 may be enabled by a network 110, which enables communication between the user device 120 and the multisensor processor 130. In one implementation, the network 110 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 110 may also utilize dedicated, custom, or private communication links. The network 110 may comprise any combination of local area and/or wide area networks, using both wired and wireless communication systems.

Multisensor Processor System Architecture

To extract information from the digital file describing one or more unidentified individuals and to match them to a known identity, the multisensor processing system 100 implements a series of visual analysis steps on the data collected by the sensor assembly 135 and/or stored in the data store 140.

Figure 2:
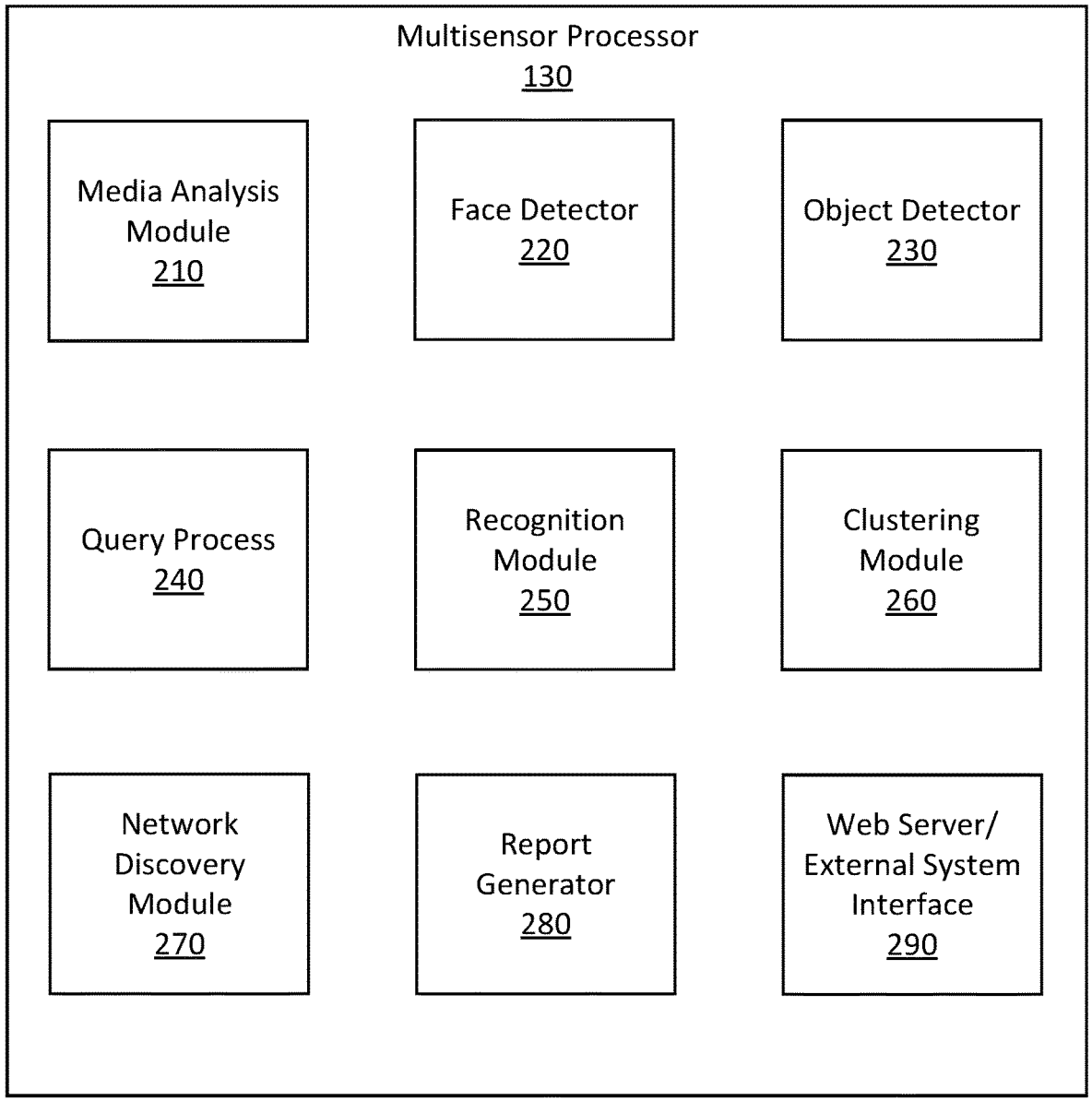
FIG. 2 is a block diagram of the system architecture for the multisensor processor, according to an embodiment.

FIG. 2 is a block diagram of the system architecture of the multisensor processor, according to an embodiment. The multisensor processor 130 includes a media analysis module 210, face detector 220, object detector 230, query processor 240, recognition module 250, clustering module 260, network discovery module 270, report generator 280, and a web server 290.

The media analysis module 210 receives the data recorded by the sensor assembly 135 or the digital file stored within the data store 140. In one implementation, the media analysis module 210 receives data directly from the sensor assembly 135 and packages the data into a digital file capable of being analyzed the multisensor processor 130, but, in alternate implementations, the data recorded by the sensor assembly 130 is packaged into a digital file and stored in the data store 140 prior to being accessed by the multisensor processor 130. The digital file may be some sort of a graphic depiction of a physical setting or group of people, for example a video received from a live camera feed or a previously stored video or image. Regardless of its format, a digital file contains information describing the position of both individuals and objects in an environment, the orientation of both individuals and objects in the environment, and the movement of the individuals or objects within the environment.

As further described herein, a digital file is a digital representation of an environment including individuals as either a single image frame or a series of image frames. In one implementation, the digital file is a video comprising a series of image frames representing activity in an environment over a period of time. For example, a digital file may use a videography sensor to record a video of the activity of multiple individuals traversing a street over a period of time (e.g., a course of several minutes or hours). For simplicity and ease of discussing the principles disclosed herein, digital files will be referenced and described herein in the context of a video recording. However, it should be understood that the techniques described below may also be applied to digital files representing images, audio recordings, or any other form of sequential data packaging. In alternate implementations, the digital file may be an image comprising a single frame describing activity in an environment at a specific point in time. For example, a digital file may use a sensor to record a screenshot of individuals in an environment. In another implementation, the digital file may be an audio recording of an individual or a group of individuals. Unlike images or videos, analysis of an audio recording may implement an audio recognition algorithm rather than an object detection algorithm.

Because video digital files describe the activity of individuals in an environment over a range of time, the sensor responsible for recording the video may record an individual in the environment at several different spatial positions within the environment. Referring to the previous example of a recording of a street, an individual may enter the field of view of the video at a sidewalk (e.g., a first position), step onto the crosswalk (e.g., a second position), and cross the crosswalk to step onto the opposite sidewalk (e.g., the third to nth position). At each of the positions, the face of the individual may be recorded by the sensor at various orientation (e.g., the individual may turn their head) or at various levels of clarity (e.g., the face may be shrouded by a shadow or fully exposed to the sensor). For example, at the first position in the video the individual's face is covered in a shadow, but as they move closer to the sensor, their face may become increasingly clear to the camera.

As described herein, "faces" refer to individuals with facial characteristics at least partially visible in the digital file (e.g., a human face or a robot with facial feature characteristics). Comparatively "objects" refer to inanimate objects or non-human organisms at least partially visible within the digital file (e.g., vehicles, signs, or animals). Objects may further be associated with "classes" which represent a group of objects sharing at least one shared feature. For example, the class "vehicle" may describe a group of objects with wheels including, but not limited to, a bicycle, a scooter, or a moped. As another example, the class "red" may describe a group of objects including, but not limited to, fire hydrants, telephone booths, and a firetruck. As described herein, "unidentified individuals" refer to individuals whose identity is not immediately known when reviewing the digital file. As will be described in further detail below, unidentified individuals may be matched with target individuals included in a search query received from a user or may be dynamically compared to a database of users in search for a match.

In some implementations, the multisensor processor 130 may implement a recognition algorithm to accurately identify the faces of unidentified individuals recorded in the video. For searches at which the identity is assigned to unidentified individuals at higher levels of accuracy, the faces of the unidentified individual and the target individual to which their being matched should share more features than an equivalent search at which the identity is assigned at a lower level of accuracy. In some implementations, the object recognition is a neural network used to identify and extract characteristics of the face of an individual from the video.

In one example embodiment, prior to implementing a recognition algorithm, the multisensor processor 130 may detect faces or objects within the video using a detection algorithm. In some implementations, the detection algorithm may be a neural network, which may be functionally different from the recognition algorithm, which is used to identify and demarcate a face from its surrounding environment recorded by the video. The detection algorithm may be implemented by the media analysis module 210, the face detector 220, and the object detector 230 in combination to detect one or more faces of unidentified individuals within the video. Depending of the computational processing constraints associated with the detection algorithm, the detection algorithm may be unable to process the high resolution digital file in which the video was originally saved. More specifically, the detection algorithm may be trained to accommodate a specific input sensor dimension, for example 512×512 pixels, whereas the original resolution of the video may be a much higher resolution, for example 4K pixels. Accordingly, the multisensor processor 130 adjusts the resolution of the video file to a detection resolution at which the detection algorithm is able to detect faces and objects within the video. To that end, the media analysis module 210 first divides the video into several frames based on the temporal conditions (e.g., a new frame is generated every 15 seconds of the video). The media analysis module 210 further divides each frame into two or more segments, for example resembling square tiles, which when aligned resemble the complete frame.

The face detector 220 and the object detector 230, respectively, receive each segment and identify faces and/or objects within the frame. Given the computational constraints of the neural network, the detection algorithm implemented by the face detector 220 may be unable to analyze the video file in its entirety. Moreover, an individual analysis of segments of a frame rather than analysis of the entire frame, allows the face detector 220 to detect faces of unidentified individuals with greater accuracy. Additionally, for each segment generated by the media analysis module 210, the face detector 220 condenses the video from its original high resolution format into a lower resolution digital file which the detection algorithm may be able to analyze with improved accuracy. For example, the original resolution may be received by the multisensor processor 130 at 4K resolution, but the face detector 210 condenses each segment into a lower resolution format of 512×512 pixels. At the lower resolution (e.g., the detection resolution), the face detector 220, distinguishes faces of unidentified individuals from the surrounding environment. The face detector 220 demarcates those faces from the surrounding environment by generating a bounding box around each of the detected faces. For example, a video of a crowd of 100 individuals is divided into five segments. For each of the five segments, the face detector 220 detects any faces within the segment such that when all segments are aligned into a complete frame, the frame includes 100 bounding boxes each including an unidentified face inside.

Any face or object within the video being considered by the detection algorithm is hereafter referred to as "a candidate face." Depending on a face's distance away from the recording sensor, it may be more difficult for the face detector 220 to accurately detect a face compared to an object resembling a face (e.g., a ball or a street sign). To that end, the face detector 220 adjusts the resolution of the segment within that segment to more accurately identify that a candidate face is actually a face and not an object shaped like a face (e.g., a sculpture of a human with a face or a circular traffic sign). Since the media analysis module 210 further divided individual frames of the video into segments, the detection recognition algorithm may process each segment as if they were an individual frames. When each segment is processed by the detection recognition algorithm at the reduced resolution, for example the 512×512 expected size of the detection algorithm, faces within the segment appear larger than they would if the complete frame were processed at the detector's expected size. At the increased sizes of each face, the face detector 220 and the detection algorithm which it implements are able to detect candidate faces in the segment with greater accuracy.

In some implementations, the resolution to which each segment is reduced by the face detector 220 is defined by the user providing the search request for individuals in the video. Alternatively, the threshold detection resolution may be determined after the completion of a training period during which the machine learned model of the detection algorithm is trained to determine an optimal detection resolution for the algorithm to detect candidate faces from a training data set. The object detector 230 implements the same techniques described above with reference to the face detector 220 to detect objects recorded by the video.

For each bounding box generated by the face detector 220 or the object detector 230, the recognition module 250 applies a recognition algorithm to the candidate face or object to extract a feature vector describing various physical properties, hereafter referred to as "features," of the face or object. The recognition module 250 identifies the bounding box of each candidate face or object and extracts a feature vector describing the image within the bounding box. In one implementation, the recognition module 250 implement an autoencoder that takes an input (e.g., the frame of a segment), encodes an input, and regenerates an output that matches the input. For example, the autoencoder may be configured to receive a frame as an input, encode the frame to a feature vector representation, and regenerate the input frame as the output (e.g., the feature vector representation). The feature vector representation is a compressed version of the input sequence, for examples the physical properties of each face or object. Examples of features identified by the face detector include, but are not limited to, a piece of eyewear, facial hair, a piece of headwear, the facial expression on the face, or the illumination of the face based on the orientation of the face relative to a light source. In one example embodiment, the feature vector representation may have a fixed number of dimensions (or elements), independent of the size of the input sequence. A feature vector may be stored as an array of feature values, each describing a physical property of the detected face or object. An integer label can be assigned to each feature value describing a level of severity for that feature.

In one example implementation, the feature value may be a whole number within a defined range where numbers closer to a particular limit, for example the upper limit of the range, indicate a higher level of severity for that feature. For example, an individual within the video with a significant amount of hair may be assigned a feature value closer to the upper limit of the range whereas an individual within the video nearly bald may be assigned a feature value closer to the lower limit of the range. Alternatively, the feature values may be a fraction between two predetermined values (e.g., 0 and 1, where values closer to 1 indicate a higher level of severity for that feature). In another implementation, feature values are assigned binary labels such that one value of the binary set, for example "1," indicates that a feature is present in the face being analyzed while the second value, for example "0" indicates that a feature is not present in the face. For example, the feature vector for the face of a bald individual is assigned a feature value of "0" for the hair feature while the feature vector for a non-bald individual is assigned a feature value of "1" to for the same hair feature. Depending on the level of accuracy to be used in identifying individuals within the video, the recognition module 250 may employ one or the other or a combination of both the aforementioned implementations, (e.g., binary feature values for less accurate searches, but a range of feature values for more accurate searches).

Based on the extracted feature vectors, the recognition module 250 compares unidentified individuals within each segment of a video to the target individuals received from a query to determine the identity of the unidentified individuals. Upon receiving feature vectors for a target individual from the query processor 240, the recognition module 250 determines a distance between the feature vector of a target individual and the feature vector of an unidentified individual. The recognition module 250 may map features between of the target individual to similar features of the unidentified individual with small distances between them. In addition to the description above, the term "distance" may correspond to any type of measurement that indicates a degree of similarity between two vectors. As the differences in the features between the target individual and the unidentified individual increase, the distance between the corresponding feature vectors may increase. When the two feature vectors comprise an embedding representing feature values obtained from a hidden layer of a neural network, the determined distance may correspond to a Euclidean distance. Alternatively, when the two vectors correspond to binary vectors, the determined distance may be a Hamming distance.

Additionally, based on the determined distance between the feature vectors of a target individual and an unidentified individual, the recognition module 250 determines a confidence level that the target individual and the unidentified individual are the same individual, also referred to as "a match." As described herein, a confidence level may refer to likelihood or probability that an unidentified individual and a target individual are the same person. The confidence level assigned to a match is indirectly related to the distance between the two feature vectors such that as the distance between two feature vectors decreases, the confidence that the unidentified individual and the target individual are a match increases. In some implementations, the confidence level assigned to a match is a function of individual features or the combination of features that are similar between the target individual and the unidentified individual. For example a similarity in skin color may result in a higher level of confidence than a similarity in the length of hair assuming the similarities between all other features to be the same. The confidence level of a match may also be based on the location or orientation of the face relative to the surrounding environment recorded by the video. For example, a face at the edge of a frame, a part of a face at the edge of a frame, or a face obstructed by a shadow or object may be assigned lower confidence levels regardless of the distance between the feature vectors of the target individual and the unidentified individual.

The query processor 240 receives a query from a user device 120 and encodes the query into a format which can be processed by the recognition module 250. Queries received by the query processor 240 may include at least one target individual, at least one target object, or a combination of both. As described herein, target individuals refer to individuals against which unidentified individuals in a digital file are compared to for a match and target objects refers to objects against which objects in the digital file are compared to for a match. Each target individual or object is compared against the unidentified individuals or objects within each segment until the recognition module 250 detects a match. For each target individual or object, the query received by the query processor 240 also includes a feature vector comprising a set of features known to be associated with the target individual or object. The feature vector associated with a target individual is generated based on a set of known images of the target individual or based on a set of features assigned to the target individual by a user of the multisensor processor 130. In some implementations, the query processor 240 extracts features of a target individual or object from a query and reformats the features to resemble a feature vector which can be processed by the recognition module 250.

Using the matches generated by the recognition module 250, the clustering module 260 organizes the segments in an order representative of a track of the movement of a single unidentified individual. Returning to the example video of traffic on a street, an unidentified individual may traverse from a point on one side of the street to a point on the opposite side of the street before exiting the frame of the video and the media analysis module 210 may generate several segments based on the individual's movement between the two points. After the recognition module 250 generates matches within each segment and organizes each of the segments in a sequential order, the clustering module 260 maps the face of each target individual to the face of the same target individual in the immediately succeeding segment. Once completed, the clustering module may re-stitch each segment into a complete video file which includes a visual track of the user's movement over the period of time recorded by the sensor. Alternatively, the clustering module 260 may access the initial un-segmented digital file and overlay the visual track of an individual's movement. In addition to the record of the movement for an individual, the track generated by the clustering module 260 further comprises a representative feature vector describing an aggregate of the feature vectors for the individual extracted from each segment of the video.

Once the recognition module 250 has identified matches within each segment for all relevant target individuals, the networking discovery module 270 determines the strength of connection between any two or more unidentified individuals in a digital file, any two or more target individuals matched within the digital file, or a combination of both. The network discovery module 250 determines the strength of any two connections as a function of both the number of times that two individuals appear in proximity together within the segment and the confidence level of the match for each individual in that segment. As the number of times that the individuals appear together and the confidence level in each match increases, the strength of connection between two target individuals also proportionally increases. Additionally, the network discovery module 270 can be configured to compute the strength of connections between each combination of unidentified individuals within a digital file, but to only report to a user a threshold number of the strongest connections or the strength of connections involving the target individuals.

The report generator 280 provides functionality for users to quickly view results of the various analyses performed by the multisensor processor 130 and to efficiently interact with or manipulate the information provided in those analyses. In implementations in which the query processor receives a query from the user device, the report generated by the by report generator 280 addresses the inquiries or requests extracted from the query. More generally, the report presented to the user comprises any combination of results and information based on the detections made by the face detector 220 and the object detector 230, matches determined by the recognition module 250, clusters organized by the clustering module 260, or networks identified by the network discovery module 270. Additionally, the report may present each segment generated by the media analyzes module 210 including the aggregate confidence level assigned to each segment, any matches within each segment, the confidence levels assigned to each of those matches, and a notification indicating that a match has been identified for a target individual. Example reports generated by the report generator 280 are further described below in reference to FIG. 10A-J.

The web server 290 links the multisensor processor 130 via the network 110 to the one or more user devices 120, as well as to the one or more user devices 120. The web server 290 serves web pages, as well as other content, such as JAVA®, FLASH®, XML and so forth. The web server 290 may receive and route messages between the multisensor processor 130 and the user device 120, for example, queries for searches of target individuals or target objects. A user may send a request to the web server 290 to upload information (e.g., images or videos) that are generated by the multisensor processor 130. Additionally, the web server 290 may provide application programming interface (API) functionality to send data directly to native user device operating systems, such as IOS®, ANDROID™, WINDOWS, or BLACKBERRYOS.

Example Segments of a Video

Figure 3A:
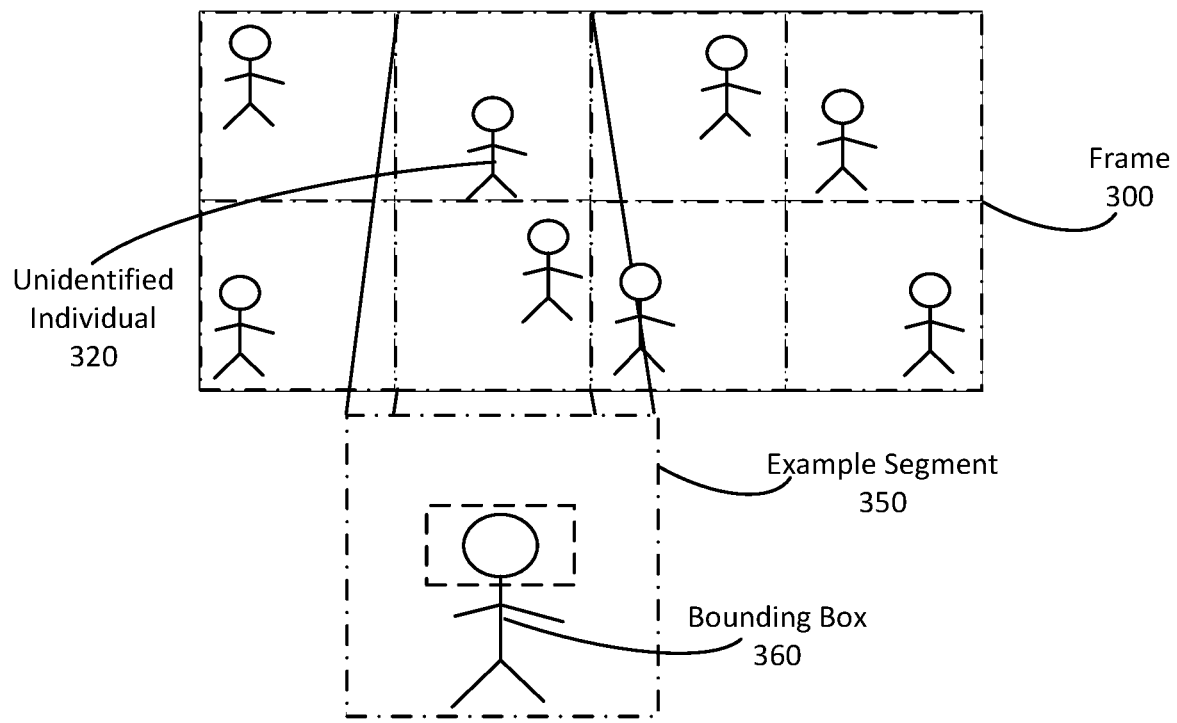
FIG. 3A shows an exemplary diagram of a segmented digital file, according to an embodiment.

FIG. 3A shows an exemplary diagram of a segmented frame, according to an embodiment. In the illustrated example, the frame 300 has been converted into eight square segments by the media analysis module 210, each of which comprises enough pixel data for the detection algorithm to process. In the illustrated embodiment, each segment contains a different unidentified individual 320. As illustrated in the example segment 350 of FIG. 3A, the face detector adjusts the resolution to a lower detection resolution relative to the resolution of the original frame and detects a candidate face within the segment. To mark the candidate face such that the recognition algorithm is able to extract a feature vector of the candidate face, the face detector 220 outlines a bounding box 360 around the face.

Both the face detector 220 and the object detector generate bounding boxes 360 around any detected faces and objects within the segment, frame, or video to which they are applied. In one implementation, bounding boxes are stored as explicit data structures containing feature descriptors. The feature descriptors assigned to the region within and along the borders of each bounding box are compared to the feature descriptors of the surrounding environment by the recognition module 250 or another recognition algorithm to identify specific instances of faces or objects.

In implementations in which the digital file is a single image frame, for example, a room with several people in it, the image is divided into multiple segments by the media analysis module 210. As discussed above, the face detector 220 adjusts the resolution of any segments generated from the single image frame such that the size of any candidate faces increase relative to the size of the same candidate faces in the original frame. For videos comprising multiple unidentified individuals, the media analysis module 210 may iteratively implement the techniques described above. For example, for a video including three unidentified individuals, the media analysis module 210 may generate a set of segments and detect the candidate faces within each segment in a simultaneous or consecutive fashion.

Example Process Flow for Segmenting a Video

Figure 3B:
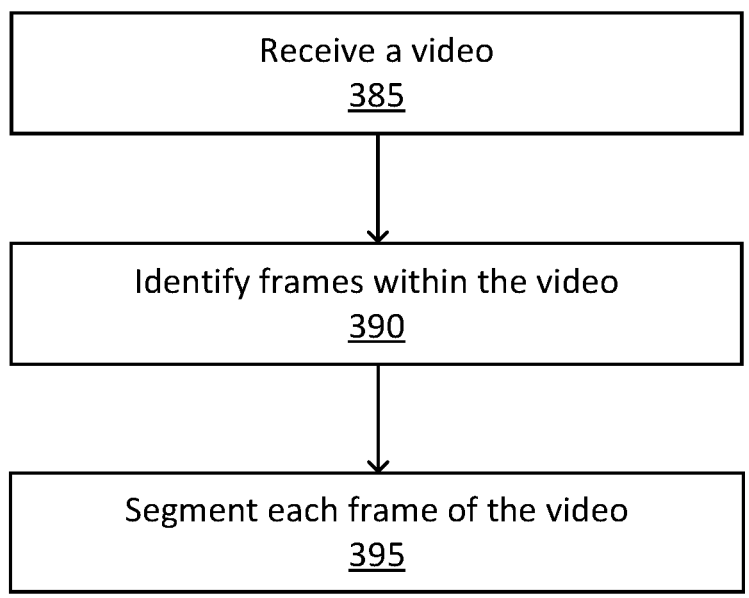
FIG. 3B shows a flowchart describing the process for dividing a digital file into segments, according to an embodiment.

To implement the media analysis module 210, FIG. 3B shows an example flowchart describing the process dividing a digital file into two or more segments, according to an embodiment. As described above, the video may be divided into multiple segments analyzed in parallel or sequentially. The media analysis module 210 receives 385 a video gathered by the sensor assembly 335 or stored within the data store 340 recording the activity of one or more people in a common environment over a period of time. For the video, the media analysis module 210 identifies 390 multiple frames within each video at temporal intervals. For example, the media analysis module 210 may divide the video into a set of freeze frames separated by 10 second time intervals. The media analysis module 210 further receives the amount of data stored within each frame and compares that amount of data to the processing capacity of the detection algorithm. For frames comprising large amounts of data which cannot be processed by the detection algorithm, the media analysis module further divides the frames into multiple segments each of which small enough to be processed by the detection algorithm. The face detector 220 or object detector 230 analyze each segment to identify any candidate faces to be further analyzed by the recognition module 250.

Example Facial Recognition in a Video

Figure 4:
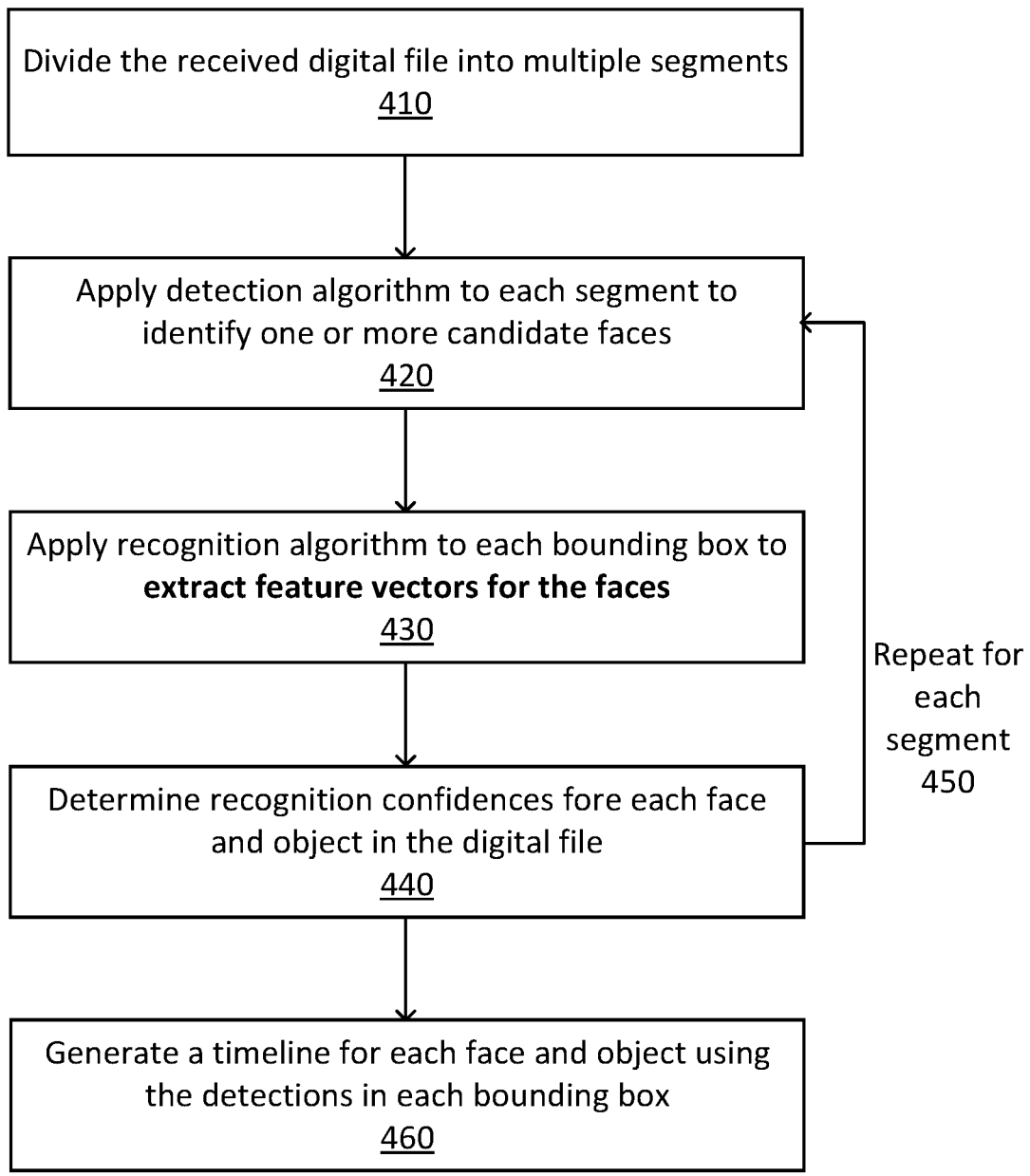
FIG. 4 shows a flowchart describing the process for identifying faces and objects in a digital file, according to an embodiment.

Although each segment of the video contains the face of an unidentified individual, over the time period of the video the unidentified individual may move to several different locations within that video. Because of the dynamic nature of an unidentified individual or objects spatial position, objects and faces of individuals are detected within each segment to preserve accuracy. FIG. 4 shows a flowchart describing the process for detecting faces and objects in a digital file, according to an embodiment. The media analysis module 210 divides 410 the received digital file into multiple segments and generates bounding boxes around faces of unidentified individuals to demarcate the faces from the surrounding and background environment recorded by the video. The face detector 220 or object detector 230 applies 420 a detection algorithm to each segment to identify one or more candidate faces or objects within each segment. The recognition module 250 applies 430 a recognition algorithm to each candidate face or object to match the candidate to a target individual or object received in a search query and determines a recognition confidence and records the temporal location of the match in the digital file. The modules of the multisensor processor 130 repeat 450 steps 420-440 for each segment of the digital file. By aggregating all of the matches for individuals and objects throughout the segments of a video, the multisensor processor 130 generates 460 a timeline for each target face and target object to be presented to the user responsible for submitting the search query.

Example Face and Object Recognition

In implementations in which the recognition module 250 employs a neural network as the recognition algorithm to extract the feature vector, the recognition module 250 extracts feature vectors from a hidden layer of the neural network that provides input to the output layer of the neural network. In an implementation, the recognition module 250 receives a training dataset in which the images have already been labeled with a set of bounding boxes. In an iteration, the neural network is trained using labeled samples of the training dataset. The labels for each sample may be assigned based on a comparison of the feature to a threshold value for that feature (e.g., an amount of facial hair on the face of the unidentified individual). At the end of each iteration, the trained neural network runs a forward pass on the entire dataset to generate feature vectors representing sample data at a particular layer. These data samples are then labeled, and are added to the labeled sample set, which is provided as input data for the next training iteration.

To improve the accuracy of matches made by the recognition module 250 between faces of unidentified individuals and faces of target individuals, the recognition module 250 adjusts the resolution of the boundary box to a higher recognition resolution, for example the original resolution of the video. Rather than extracting feature vectors from the proportionally smaller bounding box within the segment provided to the detection algorithm (e.g. 512×512) during the detection stage, the proportionally larger bounding box in the original frame of the video (e.g., at 4K resolution) is provided to the recognition module. In some implementations, adjusting the resolution of the bounding box involves mapping each corner of the bounding box from their relative locations within a segment to their proportionally equivalent locations in the original frame of the video. At higher recognition resolutions, the extraction of the feature vector from the detected face is more accurate.

Figure 5A:
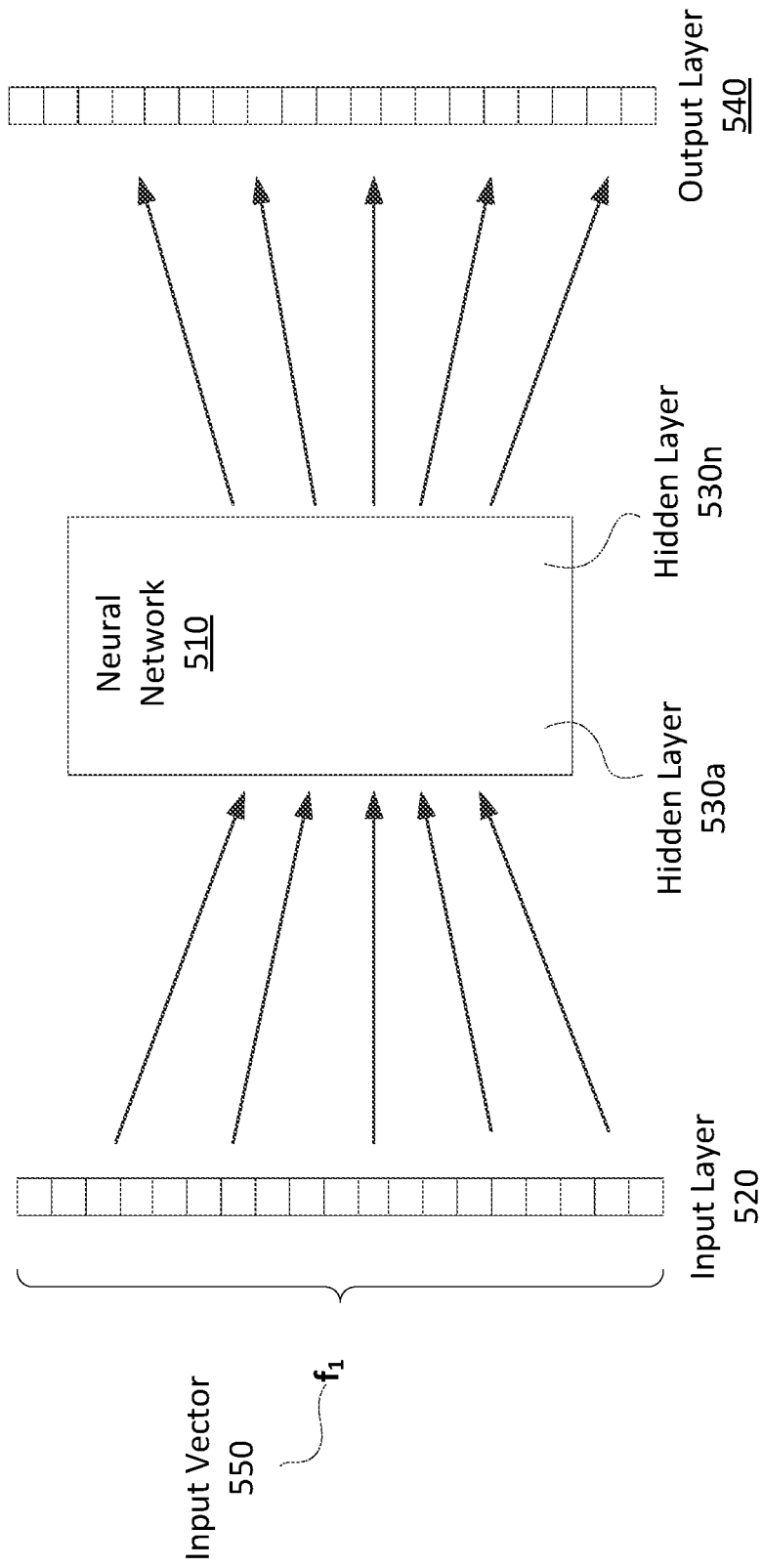
FIG. 5A shows an exemplary neural networking maintained by the multisensor processor, according to an embodiment.

FIG. 5A shows an exemplary neural network maintained by the multisensor processor, according to an embodiment. The neural network 510 is stored in a face detector 220 associated with the multisensor processing module 130. The neural network 510 includes an input layer 520, one or more hidden layers 530a-n, and an output layer 540. Each layer of the neural network 510 (e.g., the input layer 520, the output layer 540, and the hidden layers 530a-n) comprises a set of nodes (e.g., one or more nodes) such that the set of nodes of the input layer 520 are input nodes of the neural network 510, the set of nodes of the output layer 540 are output nodes of the neural network 510, and the set of nodes of each of the hidden layers 530a-n are hidden nodes of the neural network 510. Generally, nodes of a layer may provide input to another layer and may receive input from another layer. Nodes of each hidden layer are associated with two layers, a previous layer, and a next layer. The hidden layer receives the output of the previous layer as input and provides the output generated by the hidden layer as input to the next layer. A node characteristic may represent data such as a pixel and other data processed using the neural network 510. The node characteristics values may be any values or parameters associated with a node of the neural network 510. The neural network 510 may also be referred to as a deep neural network.

Each node has one or more inputs and one or more outputs. Each of the one or more inputs to a node comprises a connection to an adjacent node in a previous layer and an output of a node comprises a connection to each of the one or more nodes in a next layer. That is, each of the one or more outputs of the node is an input to a node in the next layer such that each of the nodes is connected to every node in the next layer via its output and is connected to every node in the previous layer via its input. Here, the output of a node is defined by an activation function that applies a set of weights to the inputs of the nodes of the neural network 510. Example activation functions include an identity function, a binary step function, a logistic function, a Tan H function, an ArcTan function, a rectilinear function, or any combination thereof. Generally, an activation function is any non-linear function capable of providing a smooth transition in the output of a neuron as the one or more input values of a neuron change. In various embodiments, the output of a node is associated with a set of instructions corresponding to the computation performed by the node. Here, the set of instructions corresponding to the plurality of nodes of the neural network may be executed by one or more computer processors.

In one embodiment, the input vector 510 is a vector describing an image associated with a content item. The hidden layer 530-n of the neural network 510 generates a numerical vector representation of an input vector also referred to as an embedding. The numerical vector is a representation of the input vector mapped to a latent space (e.g., latent space 156).

Each connection between the nodes (e.g., network characteristics) of the neural network 510 may be represented by a weight (e.g., numerical parameter determined in training/learning process). The weight of the connection may represent the strength of the connection. In some embodiments, a node of one level may only connect to one or more nodes in an adjacent hierarchy grouping level. In some embodiments, network characteristics include the weights of the connection between nodes of the neural network 510. The network characteristics may be any values or parameters associated with connections of nodes of the neural network.

During each iteration of training, the neural network 510 generates feature vectors representing the sample input data at various layers. The feature vector representation has the same number of elements for different input data sets even if the amount of data corresponding to the input data sets of different sizes.

Figure 5B:
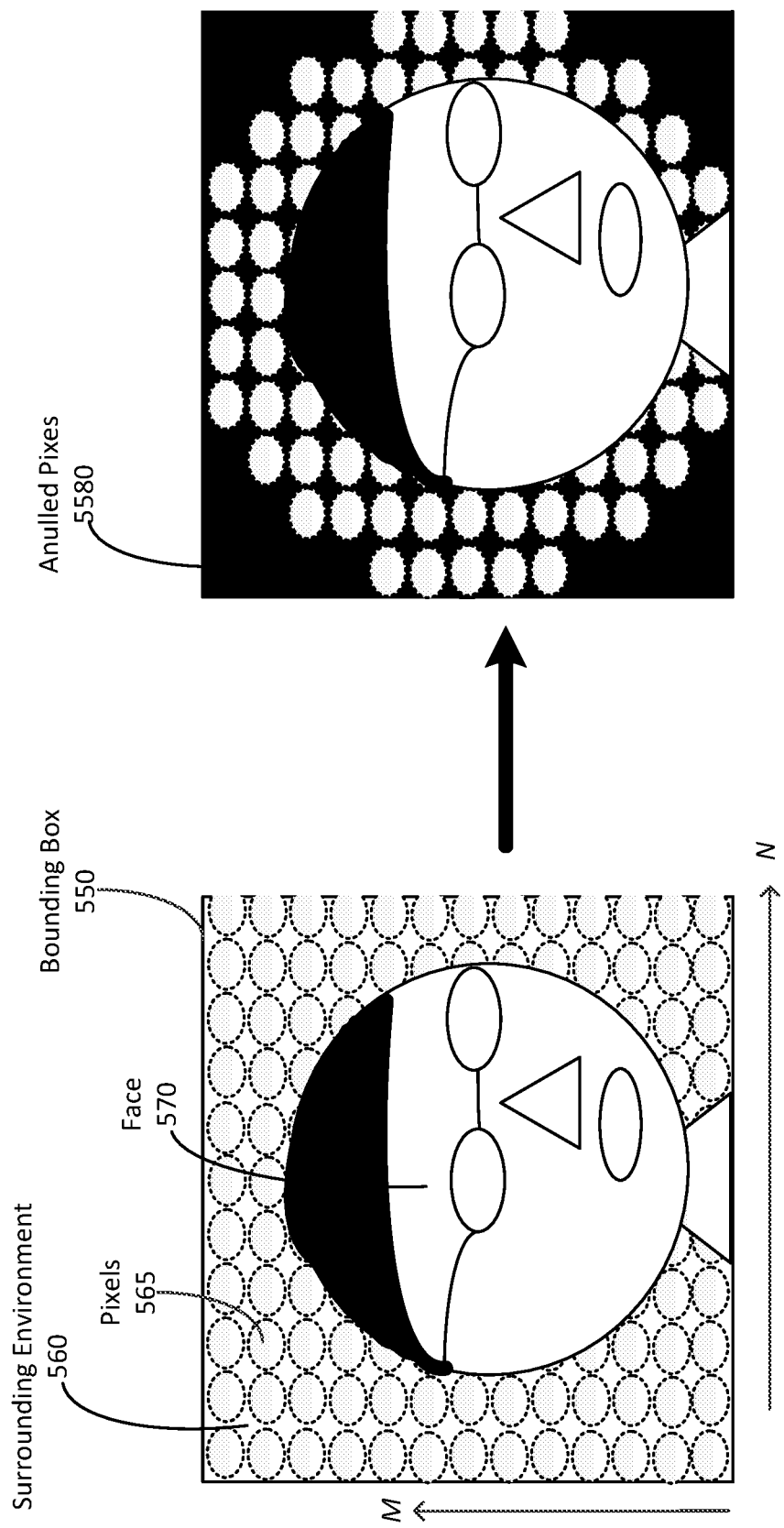
FIG. 5B illustrates an exemplary face within a bounding box subject to analysis by the face detector, according to an embodiment.

In application, the recognition module 250 recognizes a face for an unidentified individual as demarcated from the surrounding environment or individuals by the feature descriptors associated with the bounding box. In order to improve the accuracy with which a face within a segment is matched to a known identity, recognition module 250 implements image analysis techniques to remove the influence of the background and surrounding environment on this face within the bounding box. The recognition module 250 may normalize face color by pixels in the same row and column in order to focus the recognition module 250 on the actual face within the bounding box. FIG. 5B illustrates an exemplary face within a bounding box subject to analysis by the face detector, according to an embodiment. As illustrated, the bounding box 550 encompasses an image patch, for example with dimensions M×N, including the face 570 detected by the face detector 220 and a portion of the surrounding environment 560. Because pixels 565 associated with the face of an unidentified individual is positioned centrally within each bounding box 550, the recognition module 250 may determine the mean and standard deviation of the red, green, and blue values of row and column within the bounding box 550. The recognition module 250 normalizes the red, green, and blue values of each pixel 565 such that they are scaled to reduce the background influence of the image. Once the pixels 565 within the image are normalized, the recognition module 250 identifies edges and features of the face (e.g., the ears, eyes, hairline, or mouth) based on the consistency and normalized color of each pixel relative to the surrounding pixels.

In some implementations, the recognition module 250 further annuls the effect of the background by assigning red, green, and blue color values of 0 to pixels 580 on the edges of the bounding box or pixels determined to be part of the background with a high probability. Once the recognition module 250 annuls the background environment of the image, the bounding box resembles the image illustrated in FIG. 5B—a circle encompassing the face of the unidentified individual with any pixels beyond the circumference of the circle. Under the assumption that the length dimension of the face is greater than the dimension of the face, the recognition module 250 designs the circle such that the diameter encompasses the length of the face and additionally, the width of the face.

The recognition module 250 employs similar image analysis techniques as those described above to analyze objects within a segment. In some implementations, objects may be associated with an entirely new set of features than faces detected by the face detector or a set of features overlapping the features associated with a face. For example, object features include, but are not limited, a color or a shape. Additionally, each object is associated with a classification representation a group of objects sharing at least one feature. For example, a car, a truck, and a bicycle may be assigned a classification "wheeled vehicle."

Processing a User Query

Figure 6A:
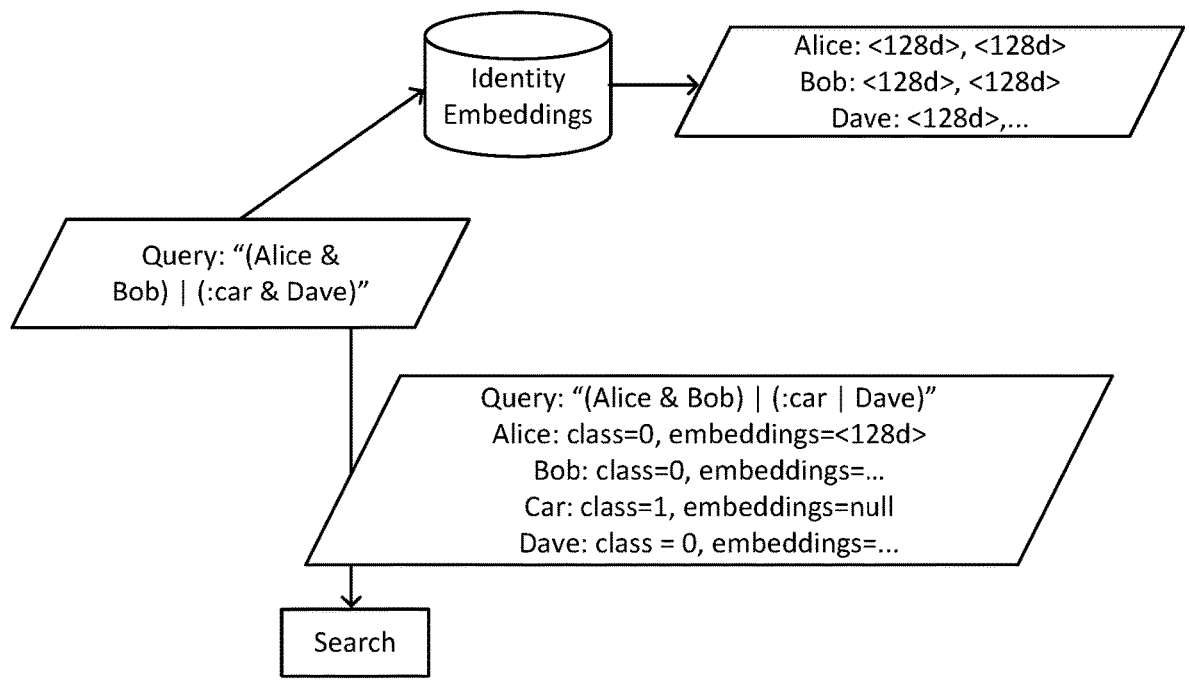
FIG. 6A illustrates an exemplary representation of a query as it is processed by the query processor 240, according to an embodiment.

FIG. 6A illustrates an exemplary representation of a query as it is processed by the query processor 240, according to an embodiment. FIG. 6A illustrates a representation based on the layered query: either "Alice and Bob" or "a car and Dave." In one implementation, the query processor 240 processes Boolean expression queries identifying at least on target identity and potentially one or more target objects using parse-tree techniques. As illustrated in FIG. 6A, the query processor splits each target individual or target object into individual search terms, for example "Alice," "Bob," "car," and "Dave." In some implementations, search terms associated with objects are assigned specific Boolean identifiers, for example ":car," to designate that that the object describes a generic object less specific than the individual users associated with search terms for a face. In additional implementations, the search terms associated with target objects may include more specific feature values, for example the color, make, and model of a car, depending on the interests of the user from which the query was received. For features of either a target object or a target individual which are not considered to be relevant to a story, the query processor 240 may recognize that the feature values are assigned labels to annul those features. In some implementations, feature vectors for target individuals may be assigned a feature value to annul the feature representing their classification at a higher level of specificity may return a more accurate match. Similarly, target objects in a query may not be assigned only a value representing their classification, with the remaining feature values of the feature vector being annulled. Alternatively, target objects may not be assigned a feature vector at all.

Figure 6B:
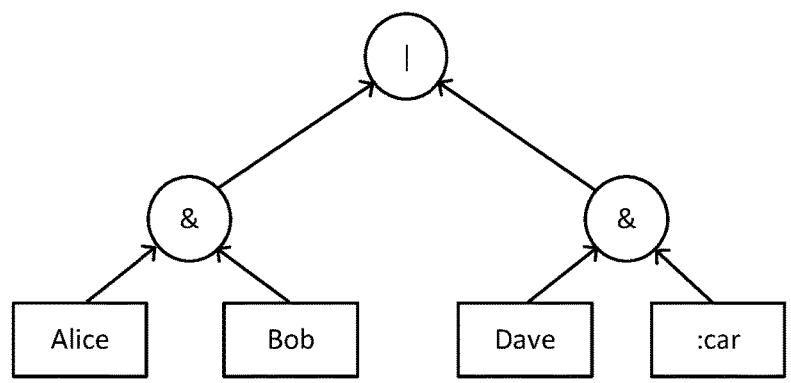
FIG. 6B illustrates an exemplary representation of a full parse-tree for a query, according to an embodiment.

As discussed above, the query processor 240 may produce a full parse of the query. FIG. 6B illustrates an exemplary representation of a full parse-tree for a query, according to an embodiment. Returning to the above example described in FIG. 6A, the Boolean expression for the query reads "Alice&Bob|:car&David," identifying target individuals Alice, Bob, and David as literal search terms and :car as a search term for an object resembling a car. The query processor 240 recognizes that the query identifies two target combinations of interest "Alice & Bob" and ":car & David" and the generates the first node with two branches of the parse-tree to represent the distinction. On each branch, the query processor further recognizes that the both search terms must be present for the detection to be of interest to a user given the "AND" boolean operator and generates a second node at both first branches with two additional branches representing the boolean operator, each of which represents the search terms that must be detected. As a result, the parse tree generated by the query processor 250 recognizes that a first search should be conducted throughout the video for Alice, Bob, Dave, and the car individually, followed by a second search should be conducted through any segments within which the target individuals are identified for the combination of target individuals or objects.

Matching Unidentified Individuals to Target Individuals

The recognition module 250 receives the identified target individuals and target objects from the query processor 240 and analyzes each segment to identify if the target individual or object is present within that segment based on the distance between the feature vector of the target individual with the feature vector of any unidentified individuals within the segment, as detected by the face detector 220. The recognition module 250 repeats the distance computation for the face of each unidentified individual in the segment such that a measure of similarity exists between each target individual identified from the query and each unidentified individual identified within the segment. The distance may be quantified as a Euclidean distance or a Hamming distance.

In order to categorize a match into confidence levels, the recognition module 250 accesses multiple ranges of distances associated with different confidence levels. For example, if all possible distance values fall within the range of 0 to 1, distances between 0.66 and 1 are labeled high confidence, distances between 0.33 and 0.65 are labeled medium confidence, and distances between 0.0 and 0.32 are labeled as low confidence. In some implementations, the recognition module 250 may receive pre-determined ranges from a user of the system either while initializing the system or embedded within the query to be extracted by the query processor 240. In alternate implementations, the recognition module 250 may dynamically determine these ranges over time using a machine learned model and a training data set comprising faces of unidentified individuals which are known to be either a match or not a match to a set of target individuals. During training, the model implemented by the recognition module 250 is trained such that the determined distances and corresponding confidence levels are statistically meaningful, for example a confidence level of 0.5 would be indicative of a 50% match. After the initial training phase, the recognition module 250 may continually update the data set used to train the model using matches between target individuals and unidentified individuals carried out in response to previous queries that have been confirmed by a user.

As described above in reference to FIG. 6B, a query may not be interested in segments with matches to a single target individual, but rather to a combination of multiple target individuals. For such queries involving combinations of target individuals, the recognition module 250 determines an aggregate confidence for the segment based on the confidence levels for matches of each of the target individuals. The aggregate segment confidence may be evaluated following the parse-tree representation for the query. Similar to the description above of confidence levels assigned to single target individuals matches, the aggregate segment confidence determined for the segment is compared one or more threshold confidence values to determine the confidence level of the segment. In some implementations, the Boolean operators affect whether a threshold confidence values indicates that a segment is labeled as high or low confidence. More specifically, a label of high confidence for a search involving the AND Boolean operator may indicate that the confidence level for the matches of all target individuals or objects of the query exceeded a minimum threshold confidence, whereas a label of high confidence for a search involving a condition Boolean operator may indicate that each of the matches was associated with a maximum confidence.

In some implementations, the recognition module 250 labels multiple unidentified individuals as a match for a single target individual. As described above in reference to the media analysis module 210, segments are generated such that each segment includes the face of an unidentified individual at a single location and orientation. However, segments may include individuals who, although not identical, at a low resolution do share similar physical features which may result in multiple matches within a segment for a single target individual. In implementations in which each match is assigned a different confidence level, the recognition module 250 identifies and selects the match with the highest confidence level as the true match. In alternate implementations, the recognition module 250 may label multiple unidentified individuals at the same confidence level, for example a "high confidence" match for a single target individual. When viewed at a low resolution, a segment may contain multiple individuals who, although non-identical to each other, may appear to share similar physical features which may result in multiple matches labeled with similar confidence levels within a segment for a single target individual. In such implementations, the recognition module 250 detects that multiple matches have occurred at the same confidence level and compares the specific distances between each feature vector of the unidentified individual to determine the closest match to the target individual. Alternatively, the recognition module 250 may detect that multiple matches have occurred for a single target individual at the same confidence level and flag all of the matches to be manually reviewed by a user of the of the system 100. The recognition module 250 may implement any single or combination of the techniques as described above.

In some implementations, the images from which the feature vectors of the target individuals are extracted are significantly higher resolution than the recognition resolution of the video file. Given the significant difference in resolutions, the recognition module may determine, for example, that the two features are not a match when in actuality the feature vectors describe the same individual. To prevent such inaccuracies, the recognition module may implement the same techniques described above in reference to the detection algorithm to reduce the resolution of the images of the target individuals such that the updated resolution now mirrors that of the segment being analyzed. Alternatively, the recognition module 250 may also increase the resolution of the images of the target individuals depending on the comparative resolution of the segment. The closeness between the resolution of the images of the target individual and the resolution of the segment or video, may be directly related to the confidence level assigned to matches within a video.

In some implementations, the multisensor processor 130 may receive one or more files to be processed without a search query for target individuals to be identified within those digital files. In such an implementation, the recognition module 250 extracts feature vectors from a video in response to the receipt of the video from the sensor assembly 135 rather than the in response to a search query received from a user device 120. The recognition module 250 may automatically begin extracting feature vectors from the segments of the file. The recognition module 250 may store the feature vectors, for example at the data store 140, to be referenced at a latter point in time or in response to a future search query. Alternatively, the recognition module 250 may identify candidate faces by comparing the feature vectors extracted from the candidate faces to one or more databases (not shown) of stored feature vectors. Such databases may be populated based on previous searches performed by the multisensor processor 130 or based on input provided by a user of the system 100.

In some implementations, the recognition module 250 is not triggered based on an output of the query processor or in response to a query at all. Instead, the recognition module 250 may receive a digital file divided into segments comprising one or more unidentified individuals and automatically begin querying one or more databases of stored feature vectors for a match. The database (not shown) may be populated based on previous searches performed by the multisensor processor 130 or based on input provided by a user of the system 100.

Once each segment and each match detected within that segment has been assigned an applicable confidence level, the recognition module 250 organizes each segment based on detected matches to a target individual and the confidence levels assigned to each of the matches, for example segments with high confidence matches may be presented to a user before segments with low confidence matches. In some implementations, segments are organized based on a comparison of the matches within the each segment to the parse-tree derived by the query processor 240 such that the segments including all nodes of the parse tree are presented to a user first, followed by segments including one or a combination of the remaining nodes. Additionally, the recognition module 250 may generate summary images for each segment based on the high confidence matches such that a user is presented with a preview of each segment and its contents. The user interface presented to a user will be further discussed below in reference to FIG. 10A-10J.

Example Process Flow for Matching Unidentified Individuals

Figure 7:
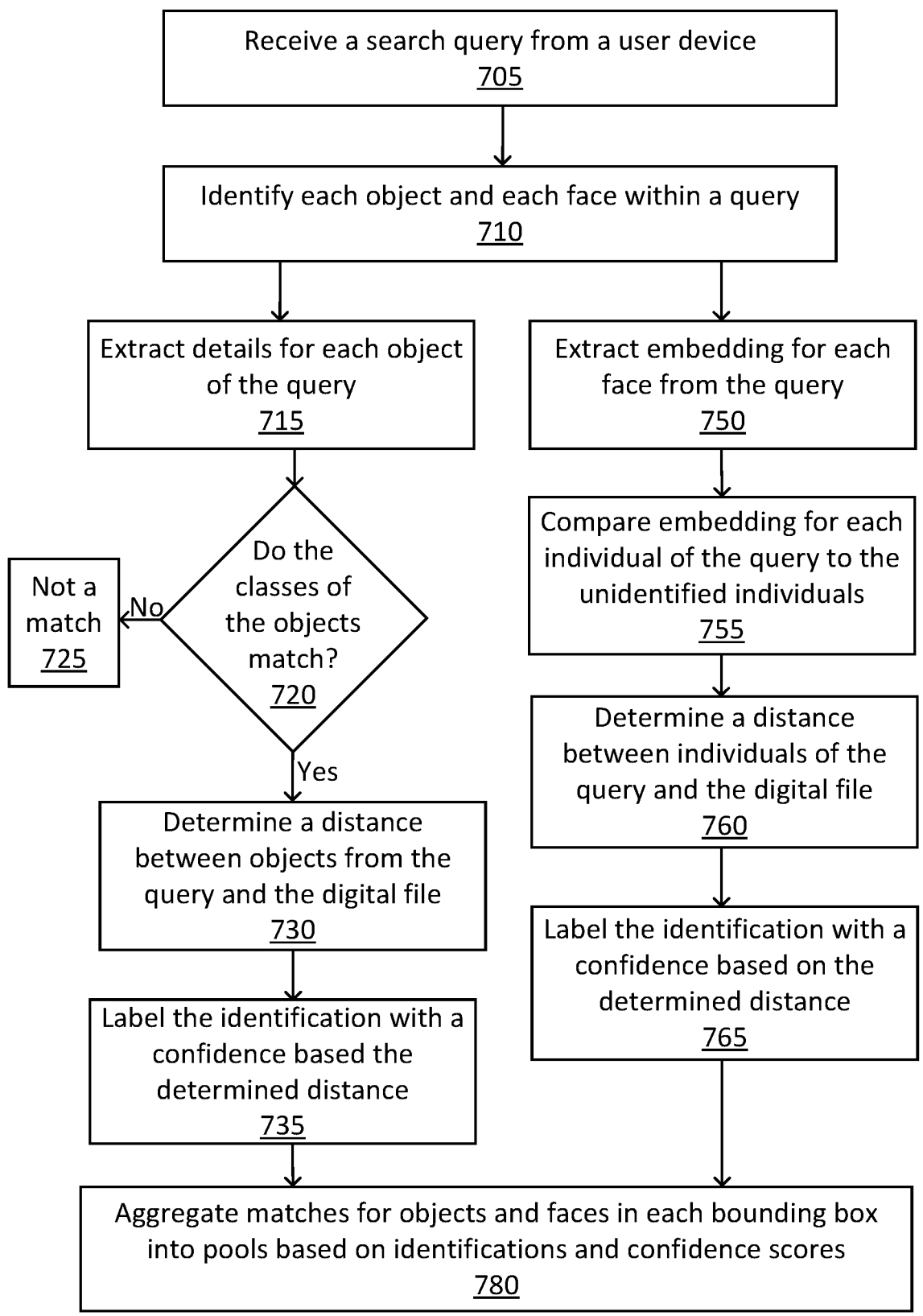
FIG. 7 shows an example flowchart describing the process for identifying matches between targets received from a query and individuals identified within a segment, according to an embodiment.

To implement the facial recognition process, FIG. 7 shows an example flowchart describing the process for detecting matches between targets received from a query and individuals identified within a segment, according to an example embodiment. As described above, the techniques used to match target individuals to unidentified individuals within a segment may also be applied to match target objects to unidentified objects within a segment. The query processor 240 receives 705 a search query from a user device and identifies 710 each target object and each target individual within the query. For each target object, the query processor extracts a feature vector from the query describing the physical properties of each object. The recognition module 250 begins to iteratively move through segments of the digital file to compare the feature vector of each target object to the feature vector of each unidentified object. Before comparing physical properties between the two feature vectors, the recognition module 250 compares 720 the classes of the two objects. If the objects do not match 725 the recognition module recognizes that the two objects are not a match and proceeds to analyze the next unidentified object within the file. If the objects do match, the recognition module 250 compares the remaining features of the feature vector and, for each match, determines 730 a distance between the two feature vectors based on the comparison. Finally, for each match, the recognition module 250 labels 735 the match with a confidence score based on the determined distance.

Simultaneously, the query extractor 240 extracts 750 a feature vector describing the faces of each target individual identified by the query and the recognition module 250 compares 755 the feature vectors of each target individual to the feature vectors of each unidentified individual. The recognition module 250 determines 760 a distance between target individuals of the query and unidentified individuals of the digital file to identify matches and labels 765 each match with a confidence based on the determined distance. Finally, the recognition module aggregates 780 the matches detected for objects and faces in each segment into pools pertaining to individual or combinations of search terms and organizes segments within each pool by confidence scores.

Tracking an Individual Through a Video

Figure 8:
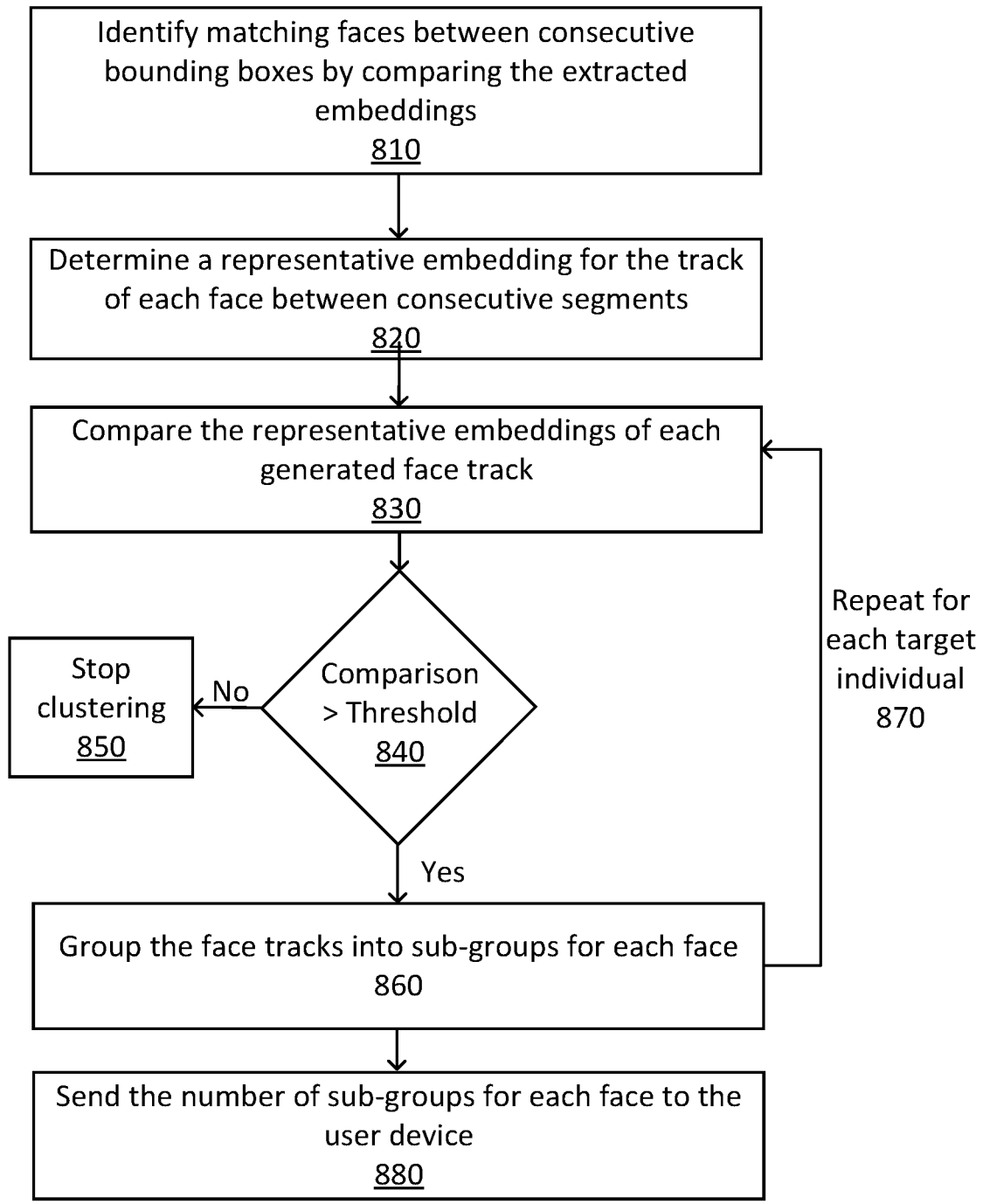
FIG. 8 shows a flowchart describing the process for clustering feature vectors extracted from consecutive segments, according to an embodiment.

In order to improve the visual representation of a single individual's movement as recorded by the digital file, the clustering module 260 clusters the faces matched to the same target individual across consecutive segments, resulting in a track of a user's movement over time. FIG. 8 shows a flowchart describing the process for clustering feature vectors extracted from consecutive segments, according to an embodiment. The clustering module 260 identifies 810 matching faces between consecutive segments by comparing the feature vectors of each face from each segment. If the distance between the two feature vectors is determined to be within a threshold value, the clustering module 260 labels the two feature vectors as of the same people. The clustering module 260 repeats this distance determination for each set of consecutive segments and for each target individual for whom a match was found in the video.

For each cluster, the clustering module 260 determines 820 a representative feature vector for the track between consecutive segments. In one implementation, the representative feature vector is determined by computing the mean of each feature across all feature vectors included in the cluster. The representative feature vector may also incorporate additional heuristics including, but not limited to, sharpness of the face, resolution of the face, the confidence value determined by the recognition module 250, and other image quality metrics.

Computations to determine whether to cluster two feature vectors may also be performed using linear assignment techniques, for example a matrix wherein each row corresponds to faces in the first frame and columns correspond to faces in the second frame. Each element in the matrix is assigned a weight corresponding to the likelihood that the two faces belong to the same individual based on the distance between the faces and the distance between their respective feature vectors. For faces which are determined to be of the same individual, the clustering module 260 assigns the face of each preceding frame to the corresponding face of the succeeding frame, for example using the Hungarian algorithm.

As a result, for search queries involving two or more target individuals, the clustering module 260 and other components of the multisensor processor 130 recognition that a particular individual cannot be identified twice within a single segment. Returning to the example of the search query interested in identifying Alice and Bob, in a single segment containing several unidentified individuals, if the identity of Alice is assigned to an individual, the clustering module 260 recognizes that no other individuals within the segment may also be assigned that identity. Accordingly, because the clustering module 260 identifies a single feature vector closest to the representative feature vector before proceeding to the next segment, the processing efficiency with which the clustering module 260 generates a track of an individual increases.

The same linear assignment techniques can also be implemented by the recognition module 250 when matching unidentified individuals to target individuals. By way of example, with an assumption that a single person cannot appear in a segment twice, if the identity of a target individual is assigned to an unidentified individual, the remaining unidentified individuals need only be compared to the remaining target individuals. In implementations in which multiple target individuals are within a threshold distance of a single unidentified individual, the recognition module 250 registers a match with the target individual with the shortest distance.

To determine whether or not to add the feature vector of a face within a segment to an existing cluster of feature vectors, clustering module 260 compares 840 the distance between each feature vector to the representative feature vector for the entire cluster. If the comparison is determined to be beyond a threshold distance, the clustering module stops 850 clustering the feature vector and moves on to the next match. However, if the comparison is determined to be within a threshold distance, the clustering module 260 groups the feature value into the existing cluster. Each time a new feature vector is included into the cluster, the representative feature vector is recomputed based on the updated cluster.

Within each cluster, the clustering module 260 groups 860 the tracks into sub-groups for each group. The clustering module 260 may compare the distances between individual feature vectors in a cluster to the other feature vectors in a cluster to assign feature vectors to sub-categories, for example "definitely the same person," or "maybe the same person." Alternatively, each sub-category may be associated with a threshold distance and each distance determined by the clustering module 260 is compared against those threshold distances. The process described above is repeated 870 for each target individual for whom a match was identified such that each target individual is assigned a cluster and a set of sub-categories within that cluster. Finally, the clusters and sub-categories of segments and feature vectors and a visual representation of the track of each target individual's movement are sent 880 to a user of the system 100 via the user interface 125.

Identifying Networks of People within a Video

Figure 9:
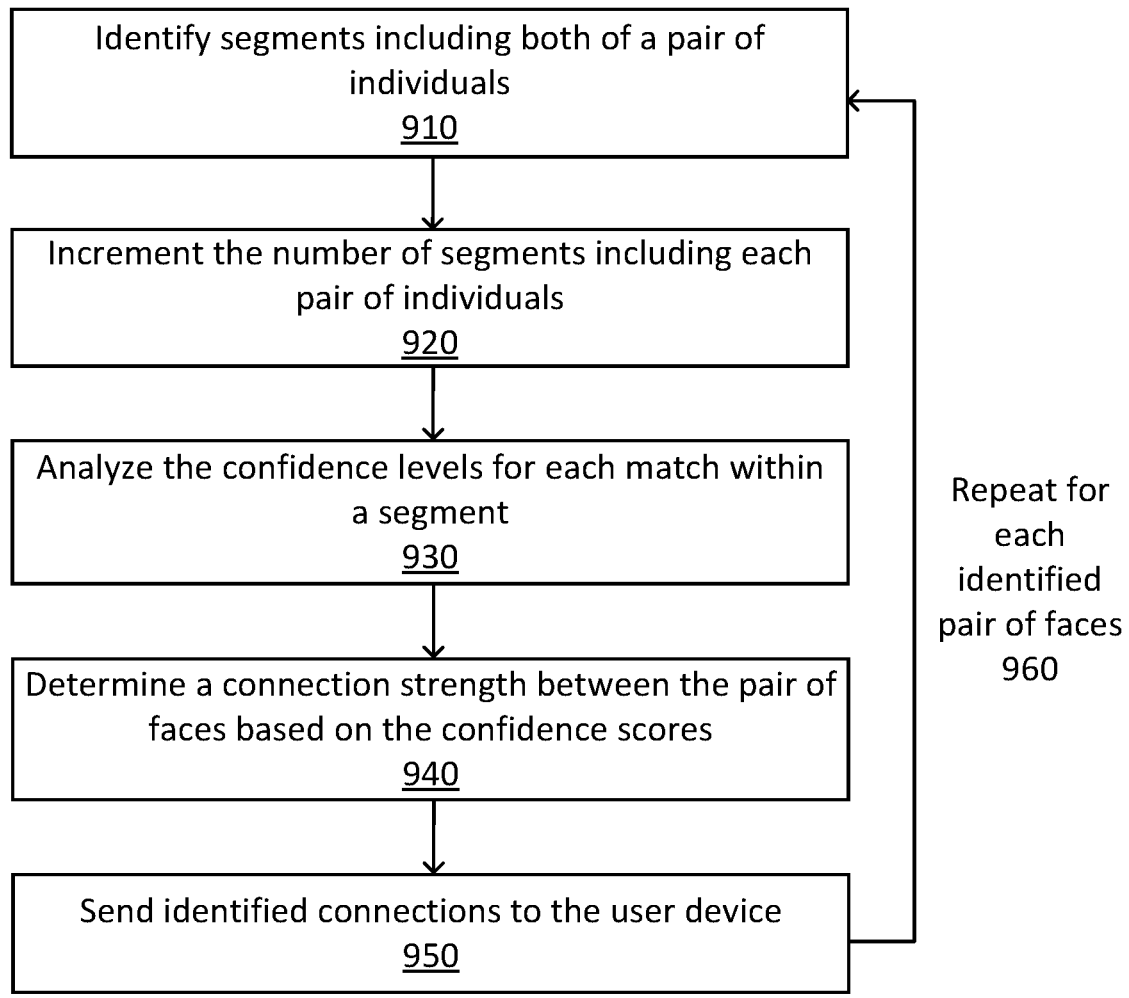
FIG. 9 shows a flowchart describing the process for determining the strength of connection between a set of individuals, according to an embodiment.

Based on the frequency with which the recognition module 260 recognizes a set unidentified individuals or target individuals within a segment, the network discovery module 270 determines the strength of connections between individuals within the set. FIG. 9 shows a flowchart describing the process for determining the strength of connection between a set of individuals, according to an example embodiment. The illustrated flowchart assumes a set of two individuals, but other implementations may include more. For implementations in which the set includes more than two individuals, the network discovery module 270 may determine a strength of connection between an individual and each remaining individual of the group, a strength of connection between the individual as a whole, or a combination of both.

The network discovery module 270 evaluates every segment of the video for the presence of a combination of individuals to identify 910 segments featuring both of a pair of individuals. For example, if implemented to determine the strength of connection between Bob and Alice, the network discovery module 270 identifies each segment in which both Bob and Alice appear within the segment. Each identified segment is assigned a label including the identities, if known, of the individuals and the confidence levels, if applicable, in their determined identities. For each segment confirmed to have recorded the pair of individuals, the network discovery module increments 920 a counter representative of the frequency with which both individuals appear together. The network discovery module 270 may also be configured to implement a threshold confidence level when determining a strength of connection between a set of people. In such an implementation, the network discovery module 270 only increments the number of segments including each pair of individuals if the aggregate confidence level for the segment exceeds the threshold value.

The network discovery module 270 also analyzes 930 the confidence levels assigned to any matches for the target individuals. For example, if the confidence levels for the match of both Bob and Alice are high, the network discovery module 270 may assign a higher strength of connection compared to if both confidence levels were low. Additionally, if the confidence level for a single individual is low while the confidence level for the other is high, the network discovery module 270 may assign a strength of connection in the between those of the two previous example. Due to the consideration of the confidence levels assigned to each match, the output of the network discovery module 270 may also be affected by the visibility of individual faces (e.g., the amount of a face visible to the camera, the amount of shade covering a face, etc.). The network discovery module 270 may also analyze the spatial locations of Bob and Alice within the environment recorded by the sensor and associate a greater strength of connection when the two are in closer physical proximity to each other.

Based on the frequency at which the pair of individuals are detected together and the confidence levels associated with each detection, the network discovery module 270 determines 940 a strength of connection between the pair of faces based on the confidence scores. As described above, a large number of high confidence detections, a high frequency of appearances, or a combination of the two is interpreted as indicative of a high likelihood that the individuals are connected, whereas a large number of low confidence detections, a low frequency of appearances, or a combination of the two is interpreted as indicative of a low likelihood that the individuals are connected. The user interface 125 may also allow the user to customize the parameters used to conduct the strength of connection determination. In one implementation, the network discovery module 270 receives instructions from the user user to assign a greater priority to the detection confidence levels than the frequency of appearances or vice versa. The network discovery module 270 may also receive instructions from the user to accept a stronger of weaker threshold confidence level depending on whether the user is interested in identifying unlikely accomplices or close partners.

Exemplary Report Interface

As described earlier in reference to the report generator 280, a report is presented to a user on a user device 120 via the user interface 125 to analyze and review the information and conclusions generated by the multisensor processor 130. It should be noted that the graphical elements of the user interface as described herein are intended to be exemplary and one of skill in the art should acknowledge that the position and orientations of the graphical elements may be adjusted while still maintaining the functionality of the user interface.

Figure 10A:
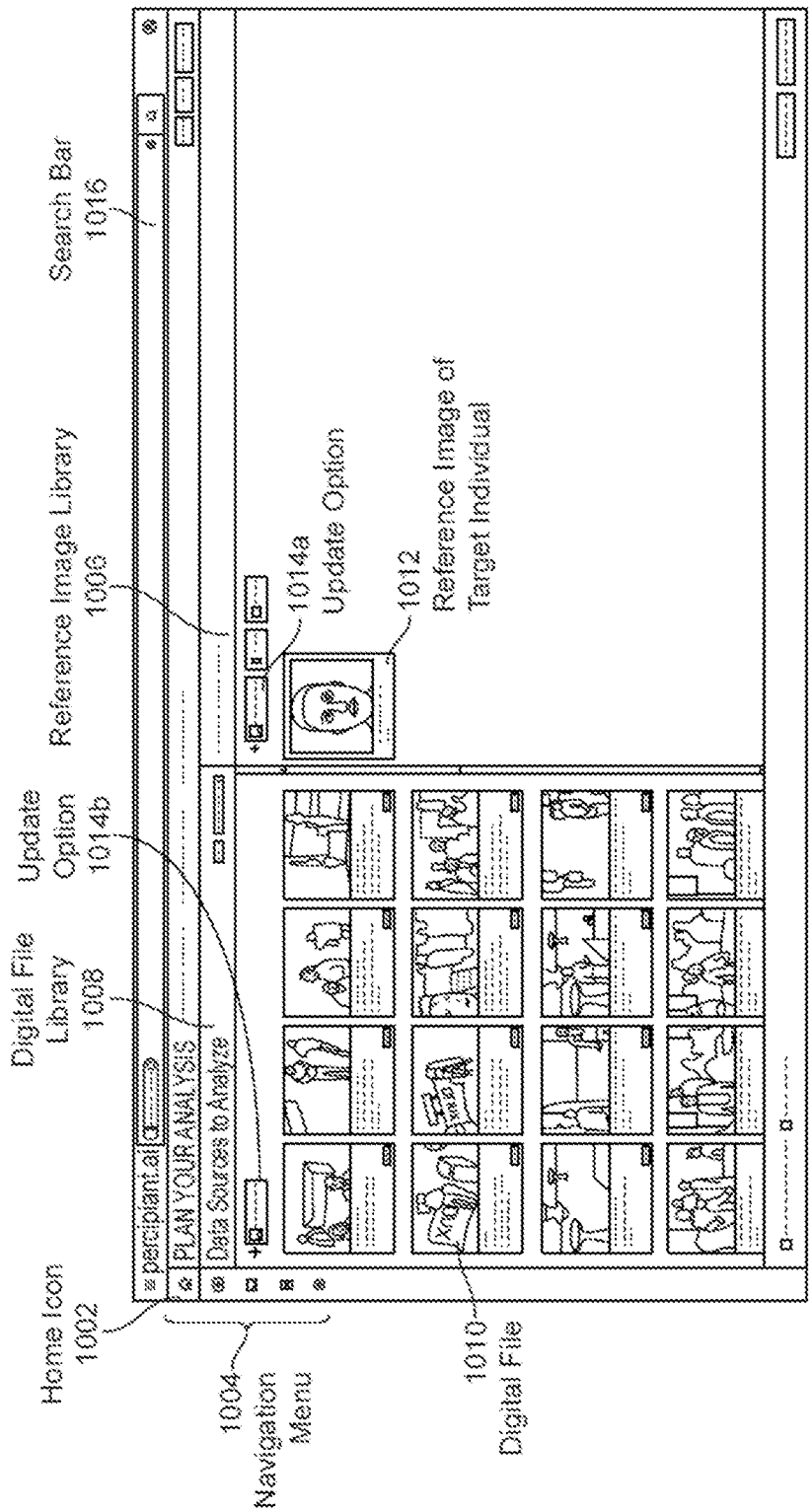
FIG. 10A-J illustrate various exemplary users interfaces presented to users of multisensor processing system, according to an embodiment.
Figure 10B:
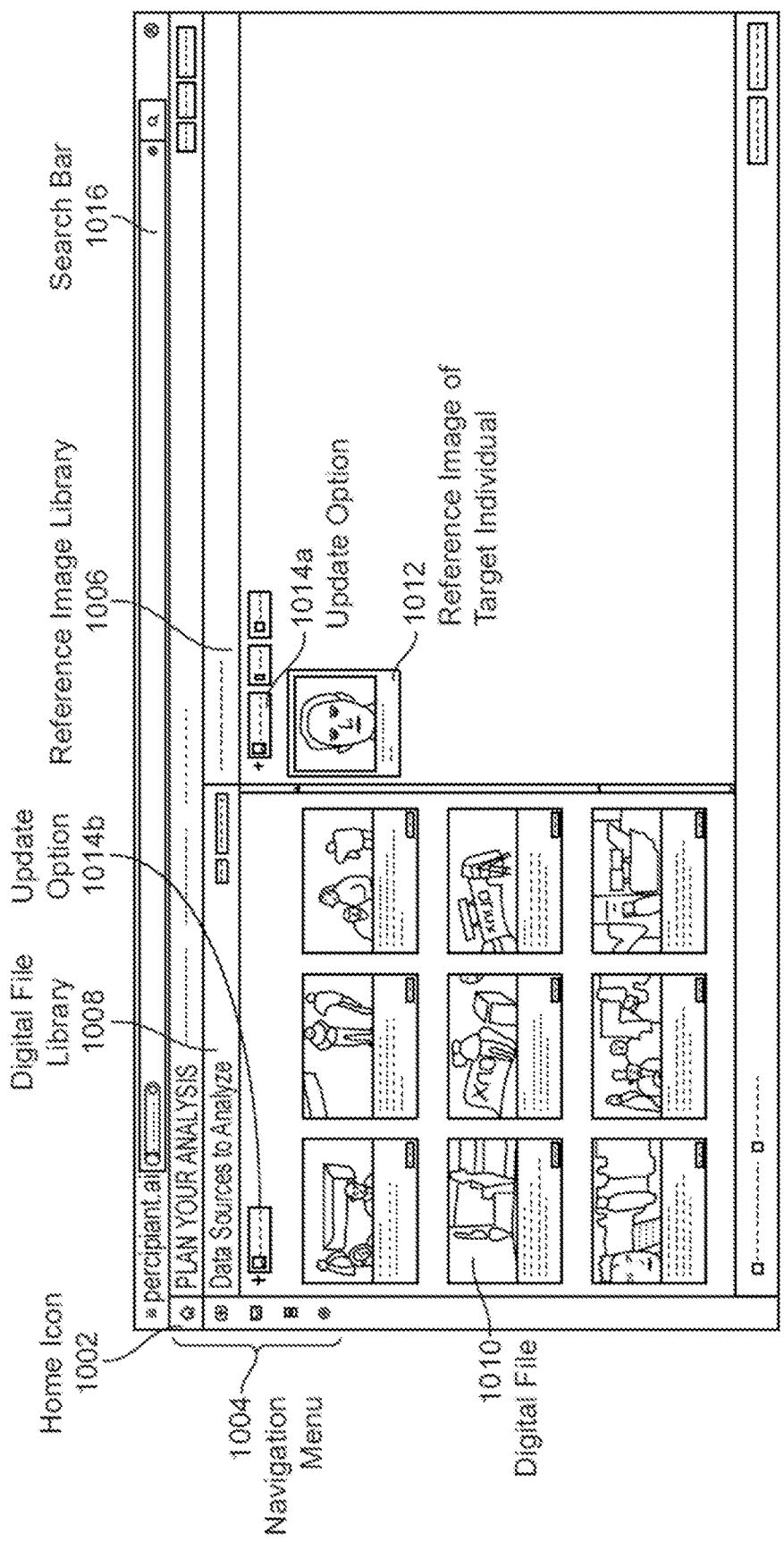

FIG. 10A is an illustration of an example graphical user interface for initializing a search query for target individuals within a digital file, according to an embodiment. To navigate to the illustrated graphical user interface, a user may select a home icon 1002 from the navigation menu 1004. As illustrated, the user interface is divided into two graphical elements: a target individual display (illustrated on the right side of the interface) containing a reference image library 1006 associated with one or more target individuals and digital file display (illustrated on the left side of the interface) containing a digital file library 1008 through which the user can search to identify a target individual. The user interface is a selectable interface wherein a user may interact with graphical elements by touch, for example the digital files 1010, the reference images of the target individual 1012, and the navigation menu 1004 of options to navigate to alternate panels of the user interface. In the illustrated implementation, each digital file 1010 and each reference image 1012 are presented using a thumbnail image associated with the content of either the digital file or the reference image in addition to a brief description of the content. The reference image of the target individual may be a highly developed, colored image or alternatively may be a lower quality image, for example an outdated image, a black and white image, or a line drawing sketch of the target individual. FIG. 10B illustrates an embodiment in which the test image of the target individual is a line drawing sketch rather than a pixelated image of the target individual. As the multisensor processor 130 identifies the target individual in digital files, the reference image library for the target individual may be dynamically updated with more recent images of higher quality. Additionally, both graphical elements also include the selectable option 1014 to manually update the library with additional content recorded by the sensor assembly or received from a third party server. In some implementations, specifying a target individual in the search bar 1016 filters the reference image library 1006 to solely images of or including the searched target individual.

After selecting a set of reference images 1012 and a set of digital files 1010 to be searched for the target individual, the multisensor processing system 100 packages the identity of the target individual, the one or more reference images of the target individual, and selected digital files into a query. The query is delivered to the multisensor processor 130. The multisensor processor 130 analyzes the digital files and query using the techniques described above and generates a report of search results to be presented to the user.

Figure 10C:
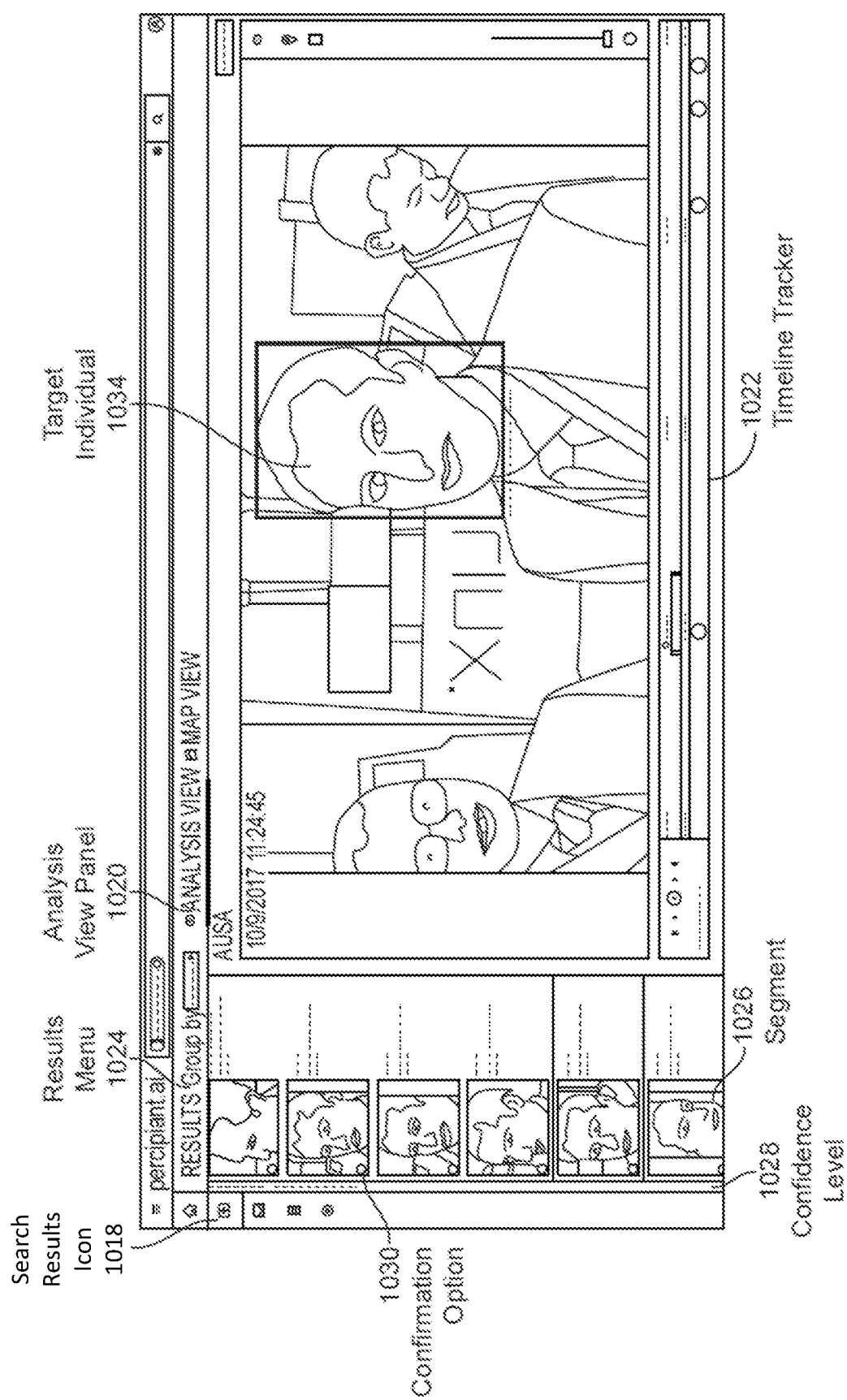

FIG. 10C illustrates an exemplary interface comprising a portion of the report presented to the user, according to an embodiment. In response to receiving a report, a user may access the report by selecting the search results icon 1018 from the navigation menu 1004. The resulting interface, as illustrated by FIG. 10C, comprises three graphical elements: an analysis view panel 1020 located central to the interface, a timeline tracker 1022 located beneath the analysis view panel, and a scrollable results menu 1024 located to the left of the analysis view panel 1018. From the results menu 1024, which comprises a thumbnail image of each segment 1026 identified from the one or more digital files and a caption describing the location and time at which the digital file was recorded, the user may select a segment which is, responsively, presented in entirety on the analysis view panel 1020. Illustrated along the edge of each thumbnail, the results menu presents a label of the confidence level 1028. In the illustrated implementations, a user may manually select segments which include accurate matches and remove segments containing accurate or unhelpful matches using selectable confirmation option 1030. The selected segments may subsequently be used to update the reference image library 1006 for the target individual. In alternate implementations, the segments assigned a threshold confidence level may be automatically added to the reference image library 1006 without user input.

The analysis view panel 1020 presents the segment in its entirety including the bounding box demarcating the face of the unidentified individual from the surrounding environment and a caption identifying the target individual 1034 was matched and the reference image used to generate the match. The timeline tracker 1022 presents a chronographic record of the time during which the video was recorded and identifies the specific timestamp during which a segment containing a match was generated. Depending on the length of the video or the number of segments generated, the timeline tracker may include a scrollable component, a fastforward option, a rewind option, or a start/stop option as illustrated in FIG. 10C.

Figure 10D:
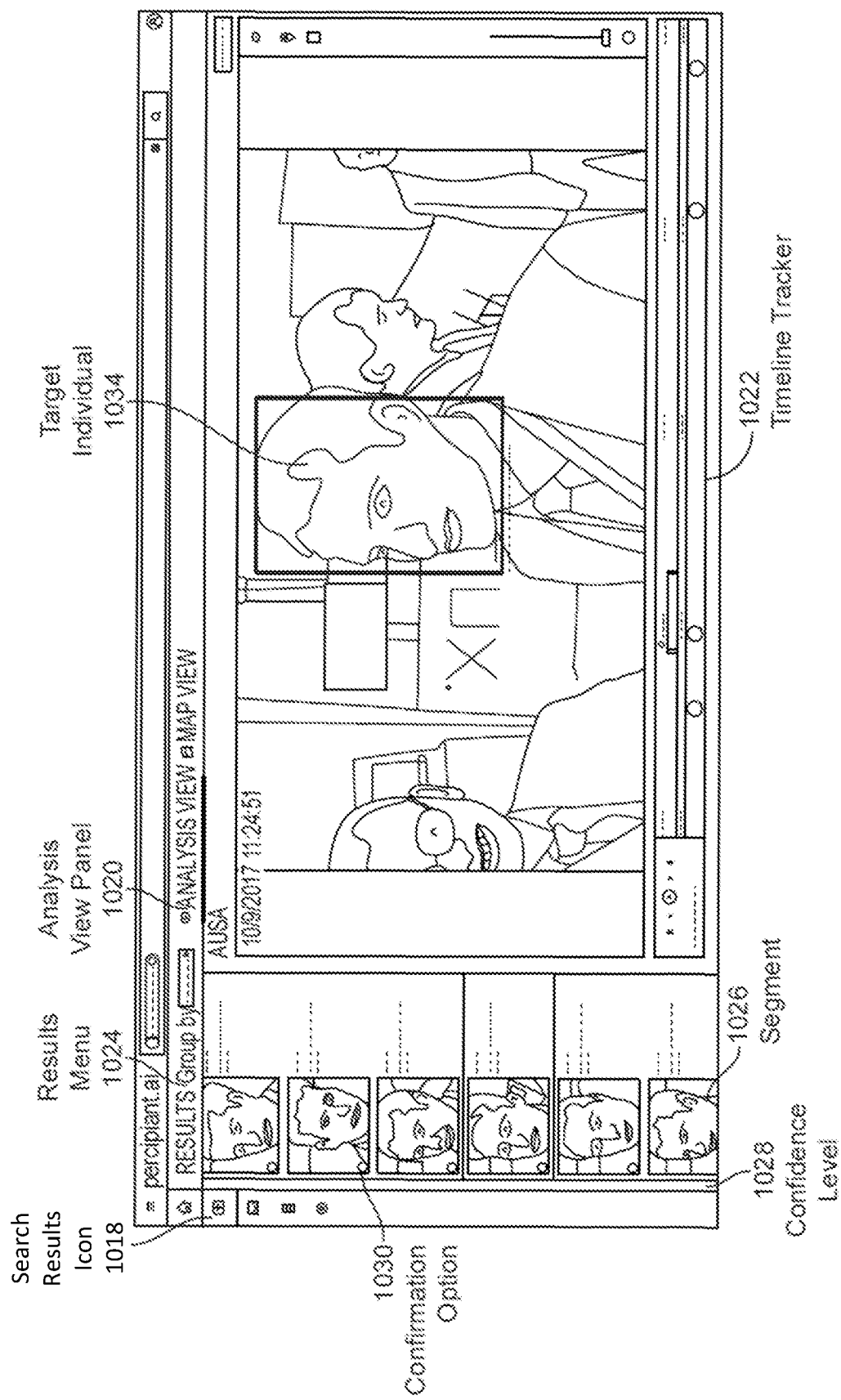
Figure 10E:
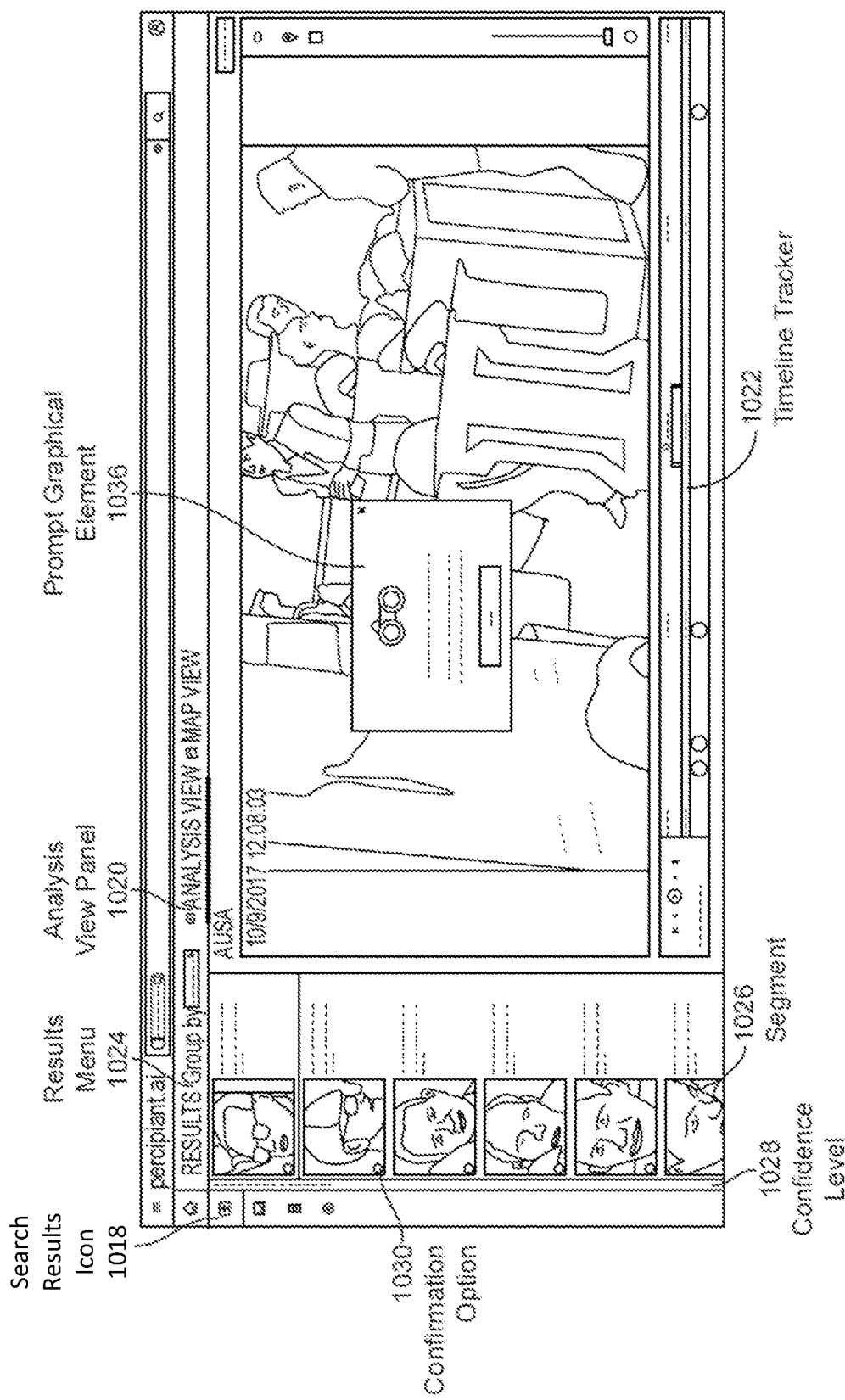
Figure 10F:
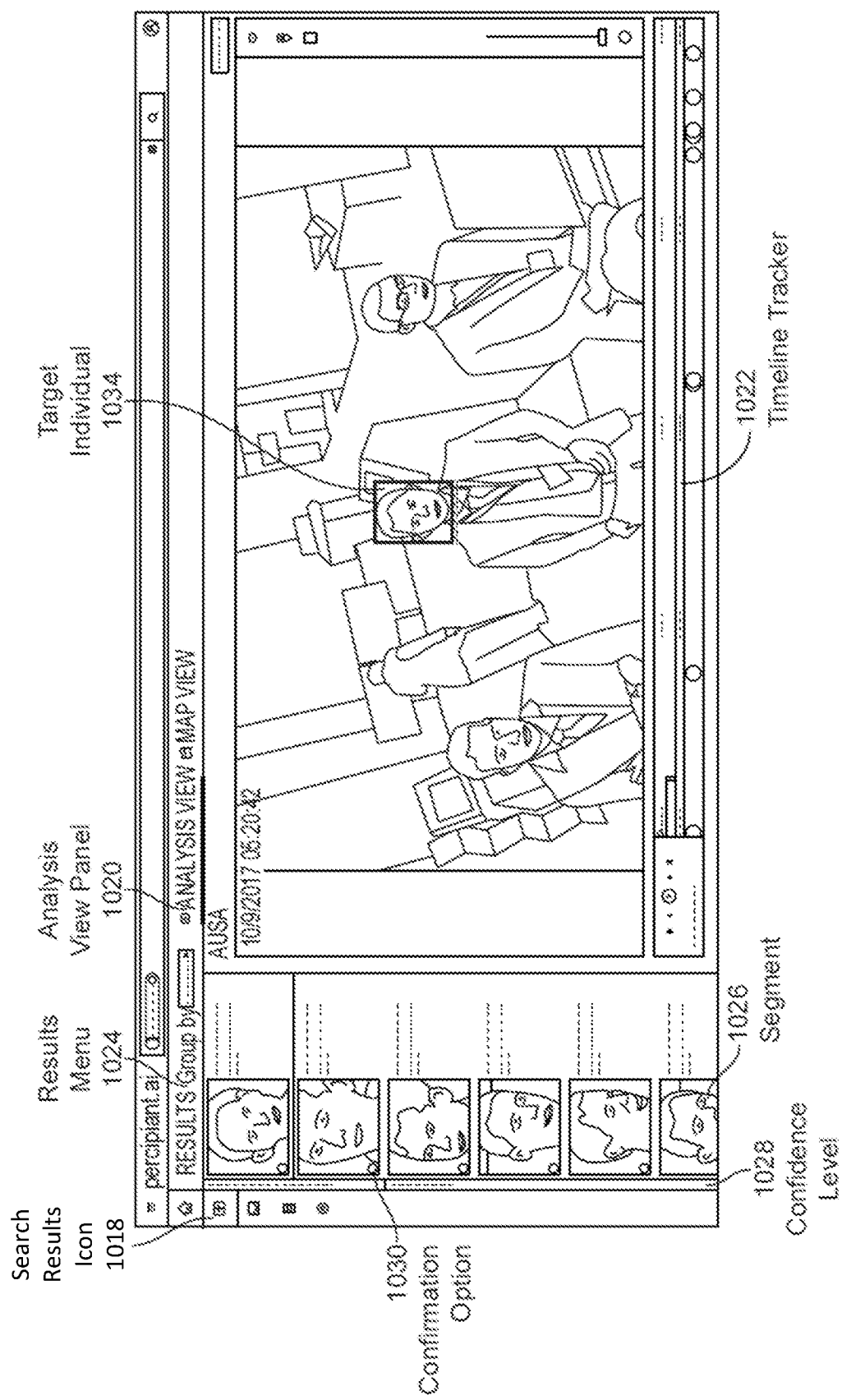

FIG. 10D illustrates an alternative example interface comprising the same graphical elements as those of FIG. 10C in which the segments of the results menu 1024 are assigned labels associated with a high confidence level. FIG. 10E illustrates an interface comprising the same graphical elements as those of FIGS. 10C and 10D in which the segments of the results menu 1024 are assigned labels associated a low confidence level. As illustrated in FIG. 10E, the user interface presents to the user a graphical element 1036 overlaying the analysis view panel 1020 prompting the user to manually confirm segments from the results menu which contain accurate matches to the target individual. As described above in reference to FIG. 10C, responsive to a user selecting a segment, the thumbnail for the segment updates to display an indicator, for example the illustrated green check. Additionally, FIG. 10F illustrates multiple segments in the results menu 1024 which were manually confirmed to contain matches to the target use, according to an embodiment. Accordingly, each confirmed segment was reassigned a label indicating high confidence in the match.

Figure 10G:
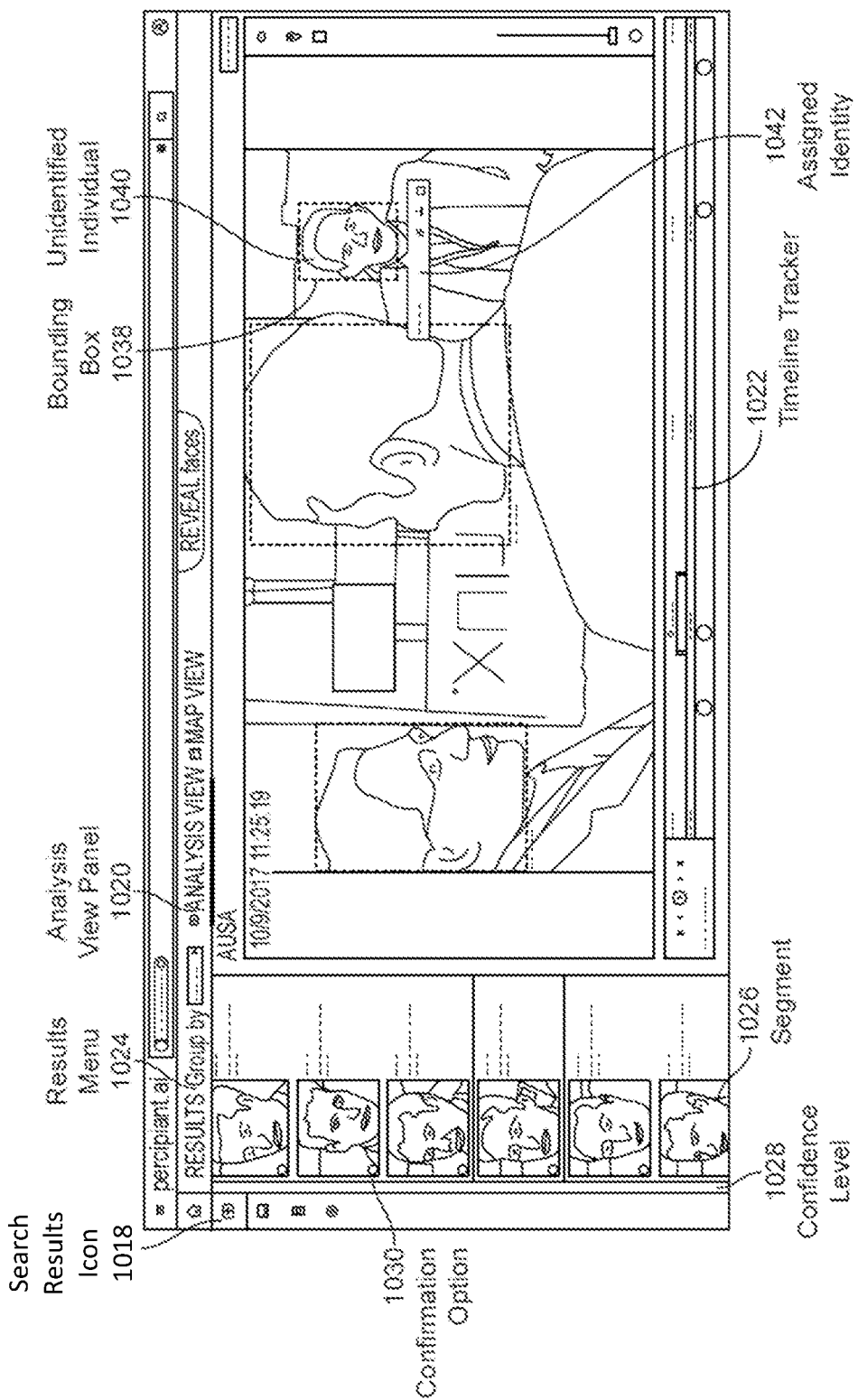
Figure 10H:
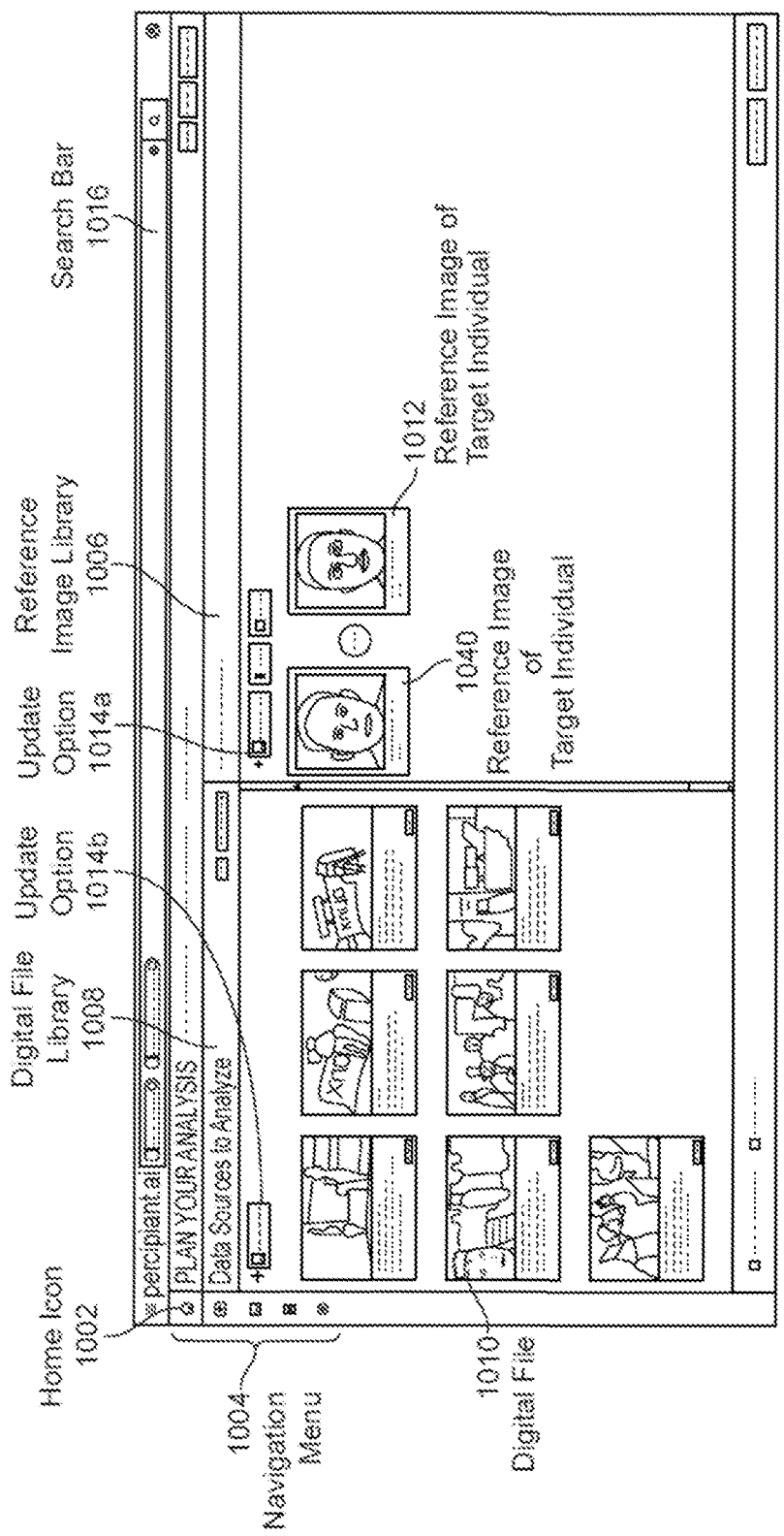

While reviewing the search results, a user may manually identify an unidentified individual in a segment, as illustrated in the embodiment of FIG. 10G. Within the segment illustrated in FIG. 10G, the recognition module 250 identified three faces outlined by bounding boxes 1038, however none of the faces were matched to the target individual specified in FIG. 10A or FIG. 10B. Accordingly, the user may manually select any of the unidentified bounding boxes and assign an identity to the unidentified individual 1040. The assigned identity 1042 may be one which already exists in the reference image library or an altogether new identity. In some implementations, a user may also manually override the identity assigned to a face by the recognition module 250 and re-assign an identity to the individual. Transitioning from the interface illustrated in FIG. 10G, a user may select the home icon 1002 to return to the home page as illustrated in FIG. 10H. The graphical elements of FIG. 10H are consistent with their description in reference to FIG. 10A. However, unlike the interface of FIG. 10A, the reference image library 1006 presented in FIG. 10H also includes a thumbnail for the face of the individual 1040 manually identified in FIG. 10G.

Figure 10I:
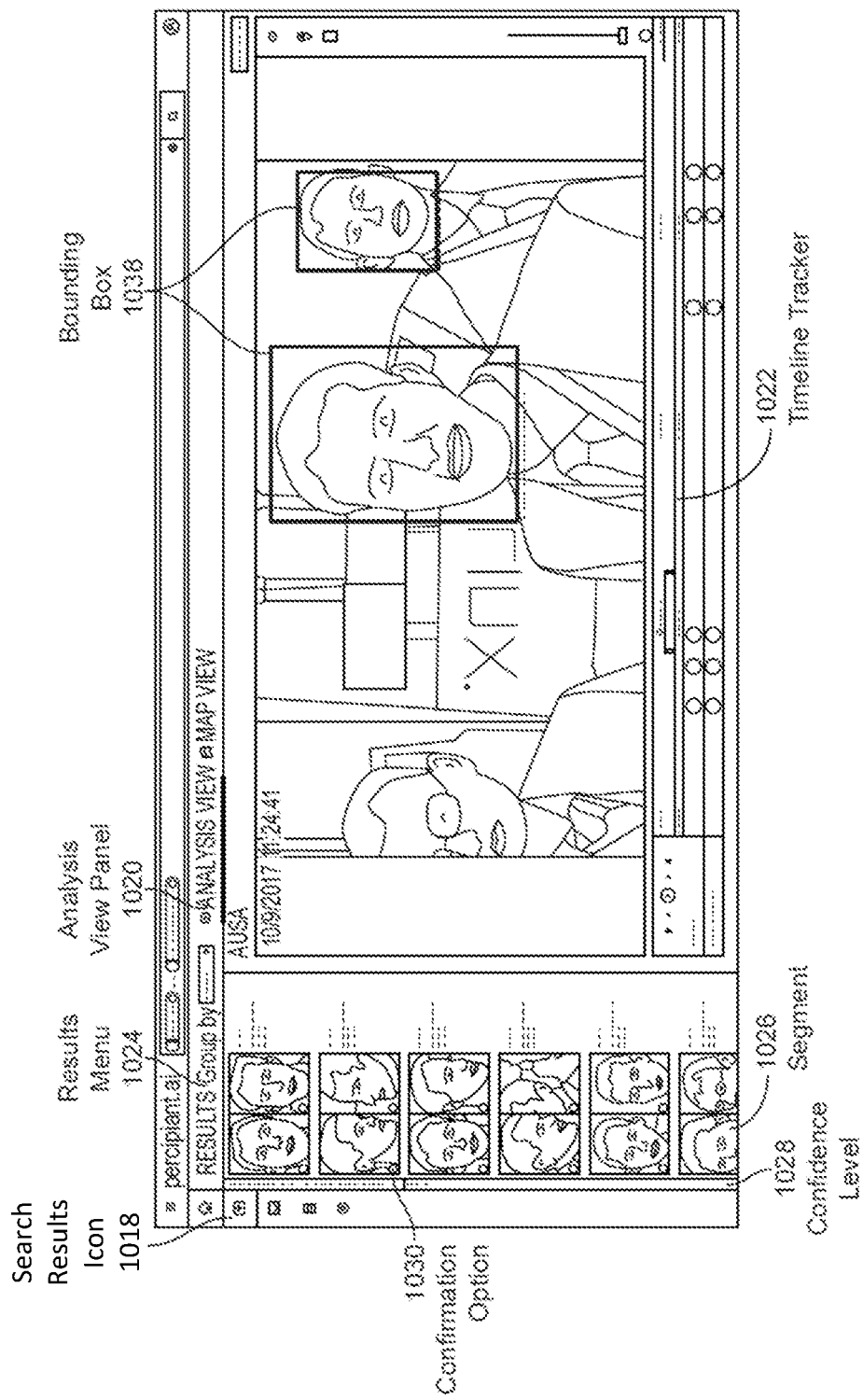

Accordingly, a user may generate an updated query including two target individuals by searching for two target individuals in the search bar 1016 to filter the reference images presented in the library or merely select reference images for the target individuals of interest from the reference image library. The multisensor processing system 100 packages and communicates the query from the user device 125 to the multisensor processor 130. In response to the query, the multisensor processor 130 communicates the results illustrated in FIG. 10I to the user interface 125. As illustrated in FIG. 10I, the face detector 220 identifies two faces outlined by bounding boxes 1038, each of which identifies a target individual included in the query. Additionally, each segment included in the results menu 1024 includes an identification of both target individuals with an assigned aggregate confidence level compared to the results menu 1024 of FIG. 10C-F which included segments only identifying a single target individual. Additionally, the timeline tracker 1022 of FIG. 10I has been updated to include an additional row indicating the appearances of the second target individuals through the digital file. Additionally, because the query requested search results in which both target individuals appear together, the appearances of one target individual on the timeline tracker 1022 mirrors the appearances of the other target individuals on the timeline tracker 1022.

Figure 10J:
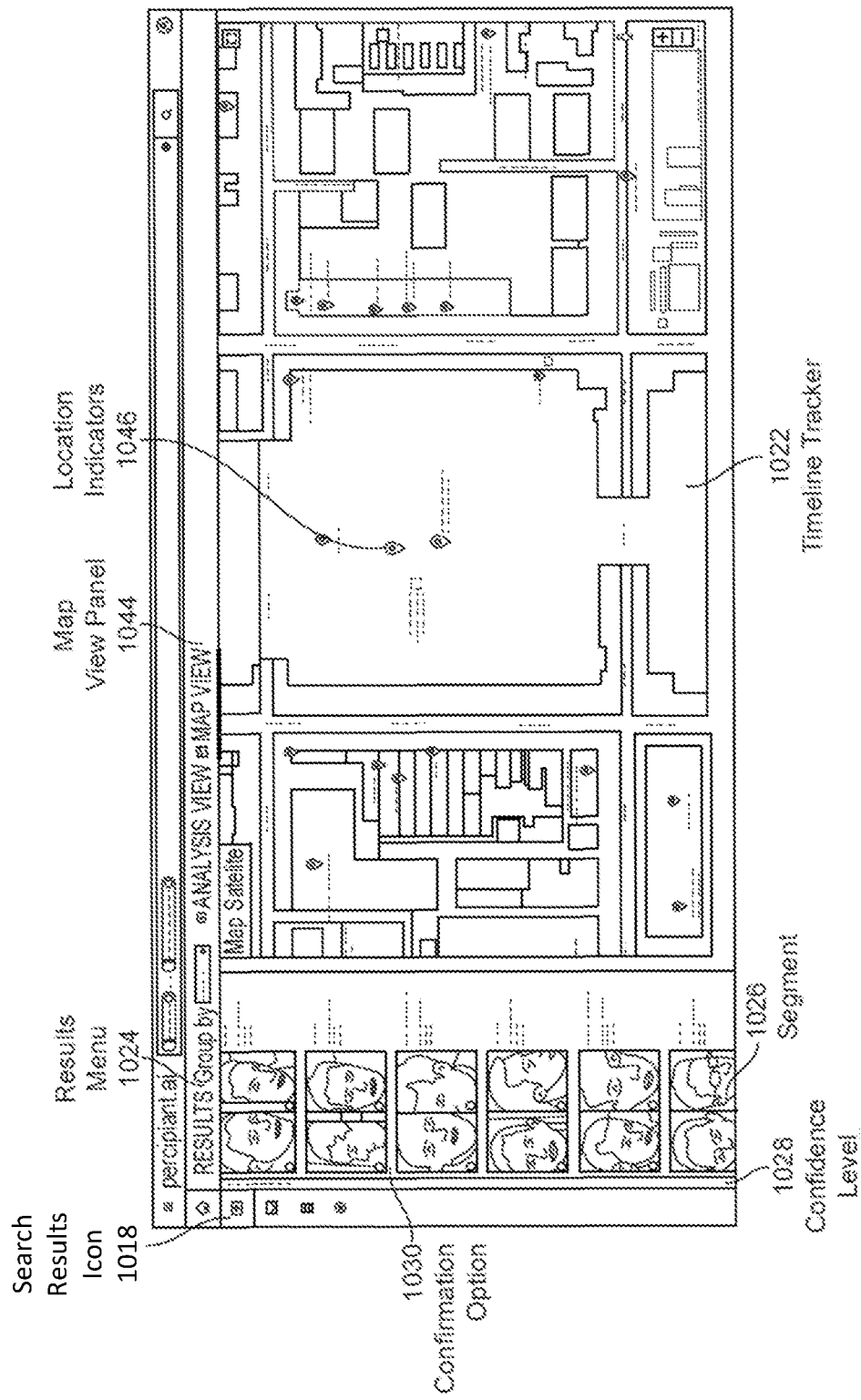

The analysis view panel 1020 described in reference to both FIG. 10C and FIG. 10I also includes a selectable option to convert the analysis view panel into a map view panel 1044. FIG. 10J illustrates a map of an area inclusive of any of the locations at which a digital file was recorded with indicators 1046 for any locations at which both target individuals appeared together. In some implementations, the map view panel 1044 or the location indicators 1046 may also display the time and dates at which the two target individuals were detected together at the location.

Computing Machine Architecture

Figure 11:
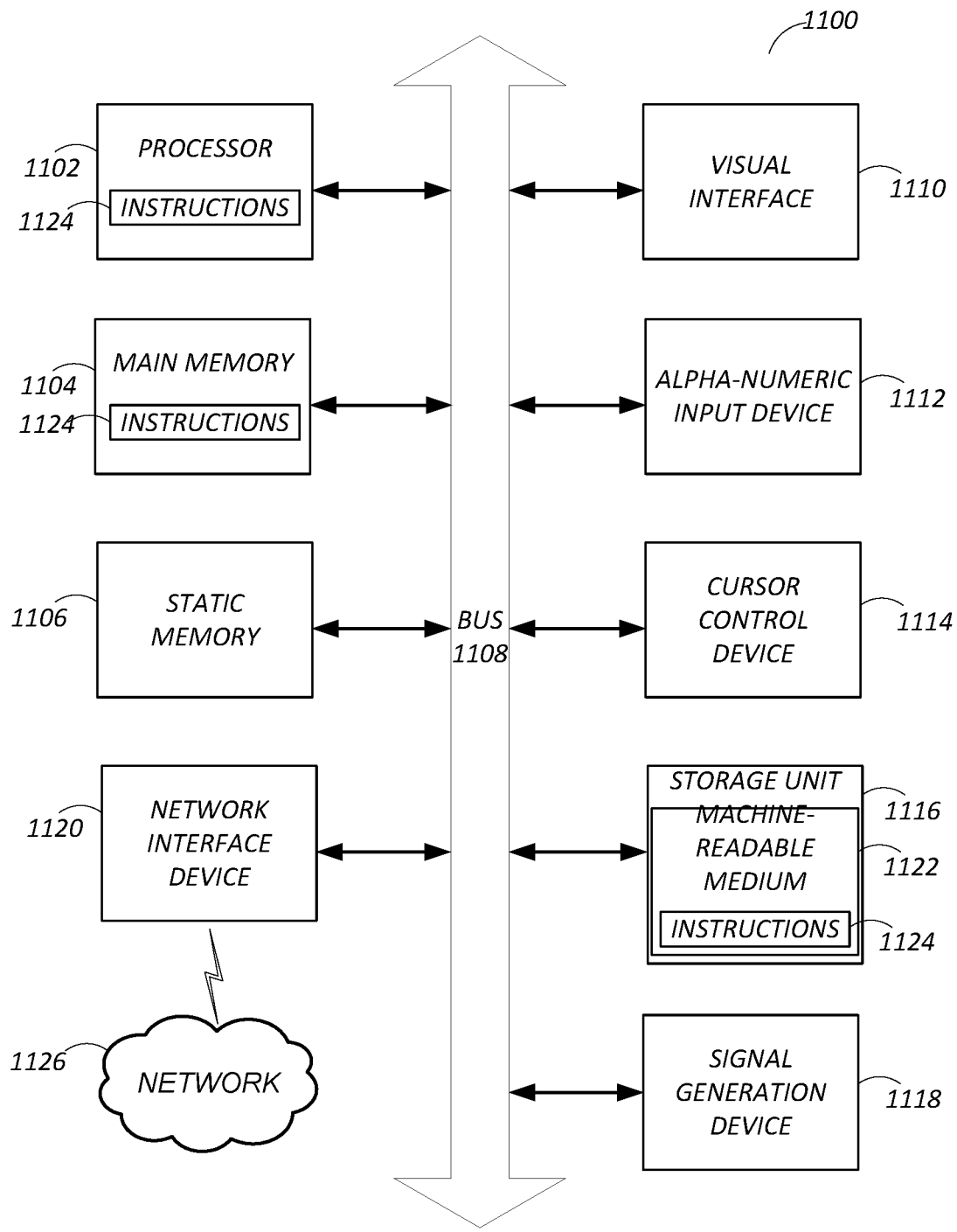
FIG. 11 is a block diagram illustrating components of an example machine able to read instructions from a machine-readable medium and execute them in a processor (or controller), according to an embodiment.

FIG. 11 is a block diagram illustrating components of an example machine able to read instructions from a machine-readable medium and execute them in a processor (or controller). Specifically, FIG. 11 shows a diagrammatic representation of a machine in the example form of a computer system 1100 within which instructions 1124 (e.g., which make up program code or software) for causing the machine (e.g., via one or more processors) to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes one or more processor 1102s (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include visual display interface 1110. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1110 may include or may interface with a touch enabled screen. The computer system 1100 may also include alphanumeric input device 1112 (e.g., a keyboard or touch screen keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

By way of example, the disclosed configurations include having search results generated by the multisensor processor 130 to users of the multisensor processing system reduce the amount of human operation required to generate accurate identifications of target users within a digital file. The adjustments in the resolution of the digital files being analyzed by the face detector 220 and the recognition module 250 significantly improve the accuracy of the system such that a human operator no longer needs to sift through large amounts of data to manually identify target users within digital files. Instead, the multisensor processor 130 analyzes the large amounts of data and generates search results in a much more efficient, timely manner. Accordingly, the multisensor processing system allows human operators to act on information identifying target users in near real-time. Additionally, the multisensor processing system 130 allows human operators to review and confirm the search results in an efficient manner, thereby increasing the accuracy without impacting the rapid response time of the system.

To increase the accuracy of the detections and identifications made using the detection algorithm and the recognition algorithm, the multisensor processor manipulates the digital file using various techniques. The processor divides frames of the digital file into segments which can be processed by the detection and recognition algorithms and adjusts the resolution to improve the accuracy with which the detection algorithm detects faces in the environment recorded in the digital file and the recognition algorithm identifies the detected faces. The resulting, heightened accuracy of the search results reduce the need for human operators to verify the search results.

Additionally, the processor assigns confidence levels to each search result reducing the need for human operators to review or confirm each search result. Instead, operators may only review search results assigned low confidence scores. Additionally, to reduce the amount of time required for operators to review identifications associated with different individuals, the processor generates clusters of identifications associated with the same or nearly similar individuals. As a result, a human operator may review all the search results for a single individual at a single time, rather than reviewing and manually organizing identifications for a single individual from a large amount of identification data.

The multisensor processor also provides unique insight to the user at near-real time speeds. The processor may analyze segments in which a target individual appears and determine the strength of the relationship between the target individual and other individuals within the digital file. Based on such insights, a human operator may update their search query or react accordingly almost immediately compared to if the operator were required to review the data manually. Additionally, the strength of connection results determined by the processor are more accurate and determined more quickly than comparable results manually generated by a human operator of the system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for determining the identities of unidentified individuals in a digital file through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. In a computer system having at least one processor and computer memory, a method for identifying individuals within a video comprising:
   accessing, from the computer memory, a video comprising a plurality of digital frames having an original capture resolution and capturing the movement of one or more unidentified individuals over a period of time;
   dividing, in the computer system, at least the majority of the plurality of frames into multiple segments, wherein each segment digitally describes a part of a frame of the video;
   in the computer system, adjusting pixel resolution of each segment to a detection resolution;
   applying, in the computer system, a detection algorithm configured to detect a face of one or more unidentified individuals within the segment;
   in at least some segments, generating a detection bounding box at the detection resolution around each of at least a plurality of the detected faces within that segment, each bounding box having a plurality of vertices;
   for each of at least a plurality of the detection bounding boxes, generating a recognition bounding box by mapping each vertex of the detection bounding box from their relative locations within a segment to their proportionally equivalent locations in the original frame of the video, whereby the recognition bounding box is proportionately larger than the detection bounding box;
   executing, in the computer system, a recognition algorithm configured to extract, for at least the plurality of the detected faces in each of the at least some segments, a first feature vector representative of the detected face in the associated recognition bounding box wherein the first feature vector is configured to be compared to a second feature vector representative of a target individual's face;
   executing in the computer system a search for one or more first feature vectors that substantially match the second feature vector by calculating the distance between the respective feature vectors wherein a substantial match is found when the distance is less than a threshold value;
   arranging the substantial matches in accordance with the calculated distance between the associated first feature vector and the second feature vector; and
   displaying at least some of the substantial matches for review by a user on a display having at least three graphical elements wherein a first graphical element comprises a scrollable results menu, a second graphical element comprises an analysis view panel, and a third graphical element comprises a timeline tracker, wherein the scrollable results menu comprises a plurality of selectable thumbnail images representative of the substantial matches and a caption describing the location and time at which each associated detection was made, the analysis view panel responsive to the selection of a thumbnail image in the scrollable results menu for displaying a digital file representative of the detection of the face represented by the thumbnail image, and wherein the timeline tracker presents a chronographic record of the time during which a relevant portion of the video was recorded.

2. The method of claim 1, further comprising:
   dividing the video into a set of frames, wherein each set of frames corresponds to a range of timestamps from the period of time during which the video was recorded; and
   wherein each segment includes a portion of the frame such that the proportion of a face with respect to the segment is larger relative to the proportion of the face with respect to the frame.

3. The method of claim 1, wherein the step of executing the recognition algorithm further comprises:
   identifying, in the computer system, the face within the bounding box based at least in part on one or more colors of pixels representing physical features of the detected face;
   for each background pixel within the bounding box, reducing the influence of each background pixel surrounding the face by normalizing the color of each background pixel within the bounding box; and
   following normalization, extracting, in the computer system, the feature vector representative of the detected face.

4. The method of claim 1, wherein the first feature vector is representative of at least one invariant physical feature of an associated detected face within the segment.

5. The method of claim 1, further comprising the step of assigning a confidence level for a match wherein the confidence level for a match is inversely related to the calculated distance between the associated first feature vector and the second feature vector.

6. The method of claim 1, further comprising:
   detecting in the computer system, within a plurality of frames, an unidentified individual, wherein the detections are based at least in part on the extracted feature vector for the detected face of the unidentified individual in each frame of the plurality;
   determining in the computer system, for pairs of consecutive frames, a distance between the extracted feature vectors;
   responsive to determining the distance to be within a threshold distance, generating, for pairs of consecutive frames, an updated feature vector representative of the detected face of an unidentified individual by aggregating the feature vectors from the pair of frames; and
   clustering in the computer system, across any plurality of frames of the video, representative feature vectors determined to be within a threshold distance.

7. The method of claim 1, further comprising:
   identifying in the computer system, from one or more frames of the video, frames in which an unidentified individual was present with a second individual;
   identifying in the computer system, for each combination of unidentified individuals and second individuals, the number of frames in which both individuals are present; and
   assigning in the computer system a label to each combination based on the identified number of frames, the label describing a strength of the relationship between the individuals of the combination.

8. A non-transitory computer readable storage medium comprising stored program code executable by at least one processor, the program code when executed causes the processor to:

access, from computer memory, a video comprising a plurality of frames having an original capture resolution that capture the movement of one or more unidentified individuals over a period of time;

divide at least some of the plurality of frames of the video into one or more sets of segments, wherein each segment describes a part of a frame of the video;

adjust, for each segment, pixel resolution of the segment to a smaller detection resolution such that a detection algorithm detects a face of one more unidentified individuals within the segment;

responsive to the detection algorithm detecting a face, generate a detection bounding box around each of at least a plurality of the detected faces within that segment, each bounding box having a plurality of vertices;

generate, for each of at least a plurality of the bounding boxes, a recognition bounding box by mapping each vertex of the detection bounding box from their relative locations within a segment to their proportionally equivalent locations in the original frame of the video, whereby the recognition bounding box is proportionately larger than the detection bounding box;

execute a recognition algorithm configured to extract a first feature vector representative of the detected face in the recognition bounding box wherein the first feature vector is configured for comparison to a second feature vector representative of a target individual's face, wherein the comparison results from a calculation of the distance between the first feature vector and the second feature vector and a substantial match is found when the distance is less than a threshold value; and display at least some of the substantial matches for review by a user on a display having at least three graphical elements wherein a first graphical element comprises a scrollable results menu, a second graphical element comprises an analysis view panel, and a third graphical element comprises a timeline tracker, wherein the scrollable results menu comprises a plurality of selectable thumbnail images representative of the substantial matches and a caption describing the location and time at which each associated detection was made, the analysis view panel responsive to the selection of a thumbnail image in the scrollable results menu for displaying a digital file representative of the detection of the face represented by the thumbnail image, and wherein the timeline tracker presents a chronographic record of the time during which a relevant portion of the video was recorded.

9. The non-transitory computer readable storage medium of claim 8, further comprising stored program code that when executed causes the processor to:

distinguish, by the recognition algorithm, the detected face within the bounding box from background pixels based on one or more colors of pixels representing physical features of the detected face;

for each background pixel within the bounding box, reduce the influence of the environment surrounding the detected face by normalizing the color of each background pixel within the bounding box; and extract the first feature vector.

10. A system comprising:

an input-output interface, communicatively coupled to at least one processor for at least partly directing storage of data in and retrieval of data from computer memory; and a non-transitory computer readable storage medium comprising stored program code executable by the at least one processor, the program code when executed causing the processor to:

access, from computer memory, a video comprising one or more frames of pixels capturing the movement of one or more unidentified individuals over a period of time, the frames having an original capture resolution;

divide at least some frames of the video into one or more sets of segments, wherein each segment describes a part of a frame of the video such that the size proportion of a face in the segment increases relative to the proportion of the face in the frame;

adjust, for each segment, pixel resolution of the segment to a detection resolution such that a detection algorithm detects a face of one or more unidentified individuals within the segment;

responsive to the detection algorithm detecting a face, map, for each detected face, their relative locations within a segment at detection resolution to their proportionally equivalent locations in the original frame of the video;

responsive to the mapping, execute a recognition algorithm configured to extract a first feature vector representative of an associated detected face wherein each such first feature vector is configured for comparison to a second feature vector representative of a target individual's face by calculating the distance between the respective feature vectors and a substantial match is found when the distance is less that a threshold value; and display for review by a user faces of unidentified individuals arranged according to similarity of the comparison between the first feature vector and the second feature vector, the display comprising at least three graphical elements wherein a first graphical element comprises a scrollable results menu, a second graphical element comprises an analysis view panel, and a third graphical element comprises a timeline tracker, wherein the scrollable results menu comprises a plurality of selectable thumbnail images representative of the unidentified individuals and a caption describing the location and time at which each associated detection was made, the analysis view panel responsive to the selection of a thumbnail image in the scrollable results menu for displaying a digital file representative of the detection of the face represented by the thumbnail image, and wherein the timeline tracker presents a chronographic record of the time during which a relevant portion of the video was recorded.

11. The system of claim 10, wherein the stored program code further comprises program code that when executed causes the processor to:

generate, by the detection algorithm, a bounding box encompassing the detected face, wherein the bounding box demarcates the detected face from a surrounding background environment recorded by the video, distinguish the face within the bounding box from background pixels based on one or more colors of pixels representing physical features of the face;

for each background pixel of the bounding box, reduce the influence of the environment surrounding the face by normalizing the color of each background pixel within the bounding box; and extract the first feature vector.

\* \* \* \* \*